(12) United States Patent
Nasukawa et al.

(10) Patent No.: US 8,132,925 B2
(45) Date of Patent: Mar. 13, 2012

(54) PROJECTOR

(75) Inventors: Satoru Nasukawa, Matsumoto (JP); Takashi Yamamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 391 days.

(21) Appl. No.: 12/554,398

(22) Filed: Sep. 4, 2009

(65) Prior Publication Data
US 2010/0073643 A1 Mar. 25, 2010

(30) Foreign Application Priority Data
Sep. 24, 2008 (JP) .................................. 2008-243656

(51) Int. Cl.
*G03B 21/14* (2006.01)
*G03B 21/22* (2006.01)
*G03B 21/28* (2006.01)
(52) U.S. Cl. ................. 353/71; 353/88; 353/98
(58) Field of Classification Search ............ 353/71, 353/82, 88–89, 94, 119, 97–99
See application file for complete search history.

(56) References Cited

U.S. PATENT DOCUMENTS

| | | | | |
|---|---|---|---|---|
| 5,400,095 A | * | 3/1995 | Minich et al. ................... | 353/119 |
| 5,428,415 A | * | 6/1995 | Keelan et al. ................... | 353/71 |
| 5,461,437 A | * | 10/1995 | Tanaka et al. ................... | 353/71 |
| 5,826,962 A | * | 10/1998 | Rodriguez, Jr. ................... | 353/82 |
| 6,379,012 B1 | * | 4/2002 | Enochs et al. ................... | 353/79 |
| 7,431,465 B2 | | 10/2008 | Ozaki et al. | |
| 2008/0129966 A1 | * | 6/2008 | Sato ................... | 353/99 |

FOREIGN PATENT DOCUMENTS

JP 2007-114753 A 5/2007

* cited by examiner

*Primary Examiner* — Tony Ko
*Assistant Examiner* — Jori S Reilly-Diakun
(74) *Attorney, Agent, or Firm* — AdvantEdge Law Group, LLC

(57) ABSTRACT

A projector includes: a light source; a light modulation device which modulates a light emitted from the light source and forms image light; a projection device which magnifies and projects the image light; and an exterior casing, wherein on a light exiting surface for the image light of the exterior casing, a first opening is formed and a projection direction change unit which opens and closes the first opening is provided, and the projection direction change unit has: a cover which has a second opening for passing the image light from the projection device and which is provided rotatably in an off-plane direction with respect to the light exiting surface and thus opens and closes the first opening; a shutter which is movably provided along an inner surface of the cover and thus opens and closes the second opening; and a reflection mirror which is provided on an inner surface of the shutter and reflects the image light from the projection device.

5 Claims, 17 Drawing Sheets

PROJECTOR

The entire disclosure of Japanese Patent Application No. 2008-243656 filed Sep. 24, 2008 is expressly incorporated by reference herein.

BACKGROUND

1. Technical Field

The present invention relates to a projector.

2. Related Art

Traditionally, a projector is used which modulates a light emitted from a light source in accordance with image information and magnifies and projects image light. Such a projector is usually placed on a desk or suspended from the ceiling in such a position that the light exiting direction of image light becomes substantially horizontal, and projects image light to a screen or wall surface provided to the forward side of the projector. However, recently, the direction of projection of image light can be changed. For example, a projector is developed that can change the direction of projection of image light toward the ceiling and can project image light to the ceiling (see, for example, JP-A-2007-114753). The projector described in JP-A-2007-114753 includes a projector body having a projection lens, and a projection direction change unit (image polarizer) that has a reflection plate and is provided to be attachable to and removable from the projector body. In this projector, since the projection direction change unit is attached to the projector body, the reflection plate can be obliquely arranged to the forward side of a projection lens. Therefore, image light emitted from the projection lens can be reflected by the reflection plate and the direction of projection of the image light can be changed. For example, if this projector is installed on a desk in such a position that the light exiting direction of image light becomes substantially horizontal, attaching the projection direction change unit to the projector body enables image light to be projected to the ceiling. Thus, a user can enjoy the image projected on the ceiling while lying down.

However, in the projector described in JP-A-2007-114753, since the projection direction change unit is provided as a separate unit from the projector body, the projection direction change unit needs to be removed from the projector body when the projector is in an ordinary state of use where image light is projected horizontally. Therefore, there is a risk that the user may lose the removed projection direction change unit. Thus, development of a projector having a projection direction change unit that can change the direction of projection and that need not be removed is demanded.

SUMMARY

An advantage of some aspect of the invention is that a projector having a projection direction change unit that can change the direction of projection and that need not be removed can be provided.

A projector according to an aspect of the invention includes a light source, a light modulation device which modulates a light emitted from the light source and forms image light, a projection device which magnifies and projects the image light, and an exterior casing. On a light exiting surface for the image light of the exterior casing, a first opening is formed and a projection direction change unit which opens and closes the first opening is provided. The projection direction change unit has: a cover which has a second opening for passing the image light from the projection device and which is provided rotatably in an off-plane direction with respect to the light exiting surface and thus opens and closes the first opening; a shutter which is movably provided along an inner surface of the cover and opens and closes the second opening; and a reflection mirror which is provided on an inner surface of the shutter and reflects the image light from the projection device.

According to this aspect of the invention, in the case of normal projection where image light from the projection device is emitted outward from the projector without changing the traveling direction of the image light, a first state is employed in which the first opening is closed by the cover and the second opening is opened by the shutter. Thus, the image light emitted from the projection device can be emitted outward from the projector through the second opening without changing the traveling direction of the image light.

Meanwhile, in the case of modified projection where the traveling direction of image light from the projection device is changed and the image light is emitted outward from the projector, a second state is employed where the first opening is opened by the cover and held obliquely to the optical axis of the image light emitted from the projection device and the second opening is closed by the shutter. Thus, the image light emitted from the projection device can be reflected by the reflection mirror and the image light with the changed direction of projection can be emitted outward from the projector.

In this manner, according to this aspect of the invention, normal projection and modified projection can be switched simply by opening and closing of the cover and the shutter. Therefore, the need to remove the projection direction change unit from the exterior casing at the time of normal projection can be eliminated and the loss of the projection direction change unit by the user can be prevented.

Moreover, since normal projection and modified projection can be switched simply by opening and closing of the cover and the shutter, the projector that can change the direction of projection can be configured without increasing the size of the projector.

It is preferable that this projector has a first lock mechanism which regulates opening of the cover in the first state where the first opening is closed by the cover and the second opening is opened by the shutter.

According to this, in normal projection (the first state), unexpected opening of the cover can be regulated by the first lock mechanism and convenience of the projector can be thus improved.

Moreover, normal projection is shifted to a third state by moving the shutter to the position where the shutter closes the second opening, the first lock mechanism cancels the regulation. Therefore, if the cover is opened and the third state is shifted to the second state, modified projection can be carried out.

It is also preferable that, in this projector, the first lock mechanism has a lock pawl which protrudes inward of the first opening from a peripheral edge of the first opening and which is located between the cover and the shutter in the first state.

According to this, if the third state where both the cover and the shutter are closed is shifted to normal projection (the first state) by moving the shutter to the position where the shutter opens the second opening, the lock pawl is located between the shutter and the cover. Therefore, opening of the cover, which holds the shutter, can be securely regulated.

Moreover, in the third state where both the cover and the shutter are closed, the lock pawl is not located between the shutter and the cover and cancels the regulation. Therefore, if the third state is shifted to the second state by opening the cover, modified projection can be carried out.

It is also preferable that the projector has a second lock mechanism which regulates movement of the shutter in a second state where the first opening is opened by the cover and the second opening is closed by the shutter, and which cancels the regulation in a third state where the first opening is closed by the cover and the second opening is closed by the shutter.

According to this, in modified projection (the second state), the movement of the shutter can be regulated by the second lock mechanism. Therefore, the image light from the projection device can be securely reflected by the reflection mirror. Moreover, in the third state where the cover is closed while the shutter is still regulated at the position where the shutter closes the second opening, the second clock mechanism cancels the regulation of the movement of the shutter. Therefore, as the third state is shifted to the first state by moving the shutter toward the position where the shutter opens the second opening, normal projection can be carried out.

It is also preferable that in this projector, the second lock mechanism has an energizing member provided on the inner surface of the cover, a stopper which is connected to the energizing member and regulates movement of the shutter in the second state, and a stopper canceling pawl which protrudes inward of the first opening from a peripheral edge of the first opening, and that in the third state, the stopper canceling pawl presses the stopper toward the cover against an energizing force of the energizing member and thus cancels the regulation.

According to this, in the second state, the stopper is located at a position away from the inner surface of the cover by the energizing member and, for example, abutted against a lateral surface of the shutter. The stopper thus regulates movement of the shutter toward the side where the shutter opens the second opening. Therefore, the image light from the projection device can be securely reflected by the reflection mirror.

Moreover, in the third state where the cover is closed while the shutter is still regulated at the position where the shutter closes the second opening, the stopper canceling pawl presses the stopper toward the cover and thus cancels the regulation. Therefore, if the third state is shifted to the first state by moving the shutter toward the position where the shutter opens the second opening, normal projection can be carried out.

It is also preferable that in this projector, in a first state where the first opening is closed by the cover and the second opening is opened by the shutter, the stopper canceling pawl is located between the cover and the shutter and regulates opening of the cover.

According to this, since the stopper canceling pawl also serves as the lock pawl, the number of members can be reduced and the manufacturing cost can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Overall Configuration

Hereinafter, an embodiment will be described with reference to the drawings.

Figure 1:
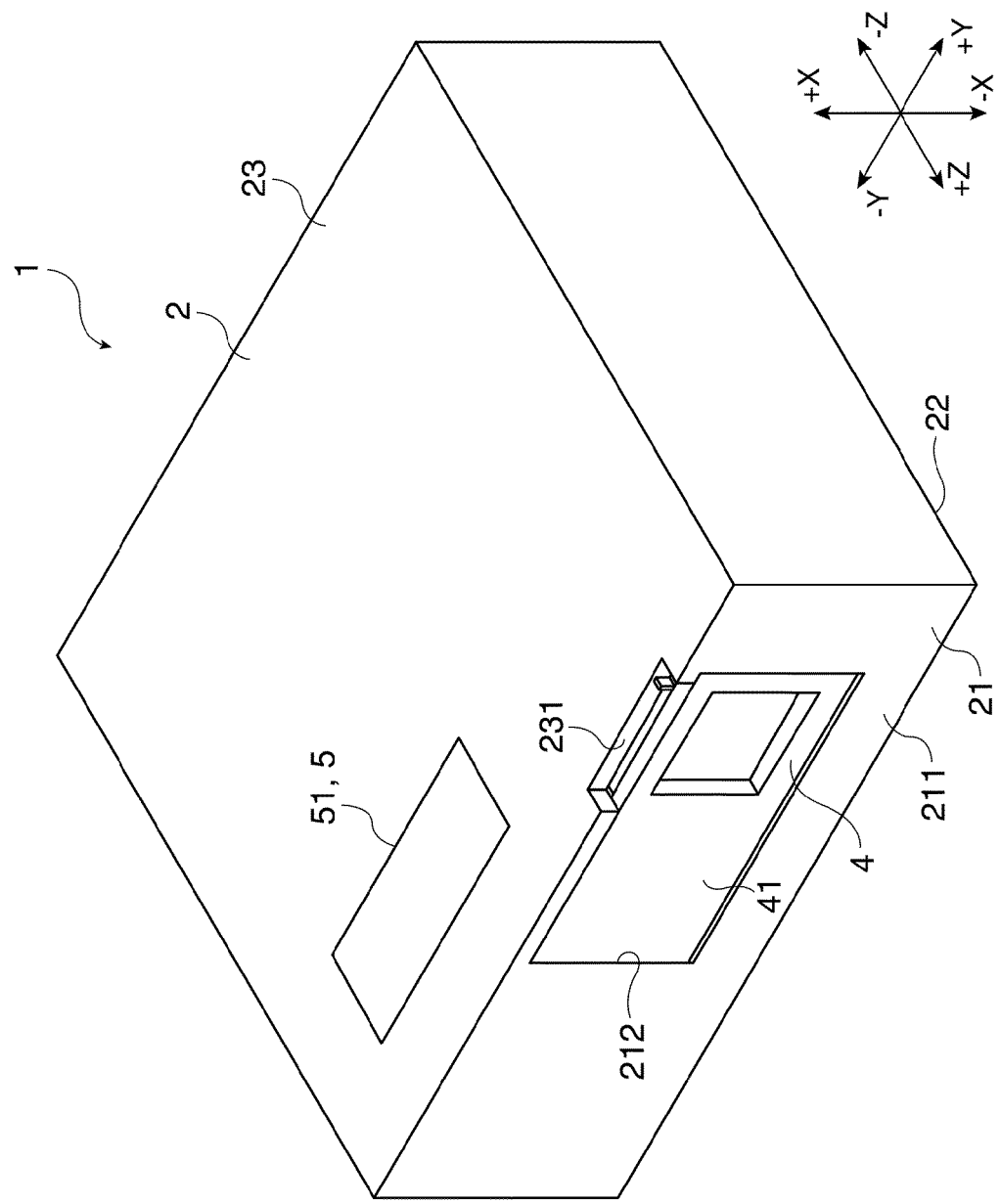
FIG. 1 is a perspective view showing a projector according to an embodiment.

FIG. 1 is a perspective view showing a projector 1 according to this embodiment. In the following, for convenience of explanation, the light exiting direction of image light is referred to as a +Z axis and the direction opposite to +Z axis is referred to as a −Z axis. The direction orthogonal to the Z axis is referred to as an X axis. In the X axis, the direction toward a top surface 23 is referred to as a +X axis and the direction toward a bottom surface 22 is referred to as a −X axis. The direction orthogonal to these X and Z axes is referred to as a Y axis.

The projector 1 is placed on a horizontal surface, for example, on a desk, and magnifies and projects image light to a screen placed to the forward side of the projector 1 or to the ceiling situated above the projector 1. This projector 1 includes an exterior casing 2, an optical unit 3 (see FIG. 2), a projection direction change unit 4, an operation unit 5, and a control device 6 (see FIG. 9), as shown in FIG. 1.

Configuration of Exterior Casing

The exterior casing 2 is formed in a box-shape and houses the optical unit 3 and the control device 6 therein. The exterior casing 2 has lateral surfaces 21, a bottom surface 22 facing a horizontal surface when the projector is placed on the horizontal surface, and a top surface 23 situated to the ceiling side when the projector is placed on the horizontal surface. Of the lateral surfaces 21, a surface that faces a projection lens 36, which will be described later, is a light exiting surface 211 from which image light is emitted outward from the projector 1. On this light exiting surface 211, a first opening 212 is formed and the projection direction change unit 4 which opens and closes the first opening 212 is provided. On the top surface 23, an operation panel 51 which forms the operation unit 5 is provided. Also, a cut-out 231 opened toward the light exiting surface 211 is formed toward the light exiting surface 211 on the top surface 23. Moreover, on the back side of the top surface 23, a stopper canceling pawl 44 (see FIG. 3) which forms the projection direction change unit 4 is formed along the −Y axis direction on the cut-out 231.

Configuration of Optical Unit

Figure 2:
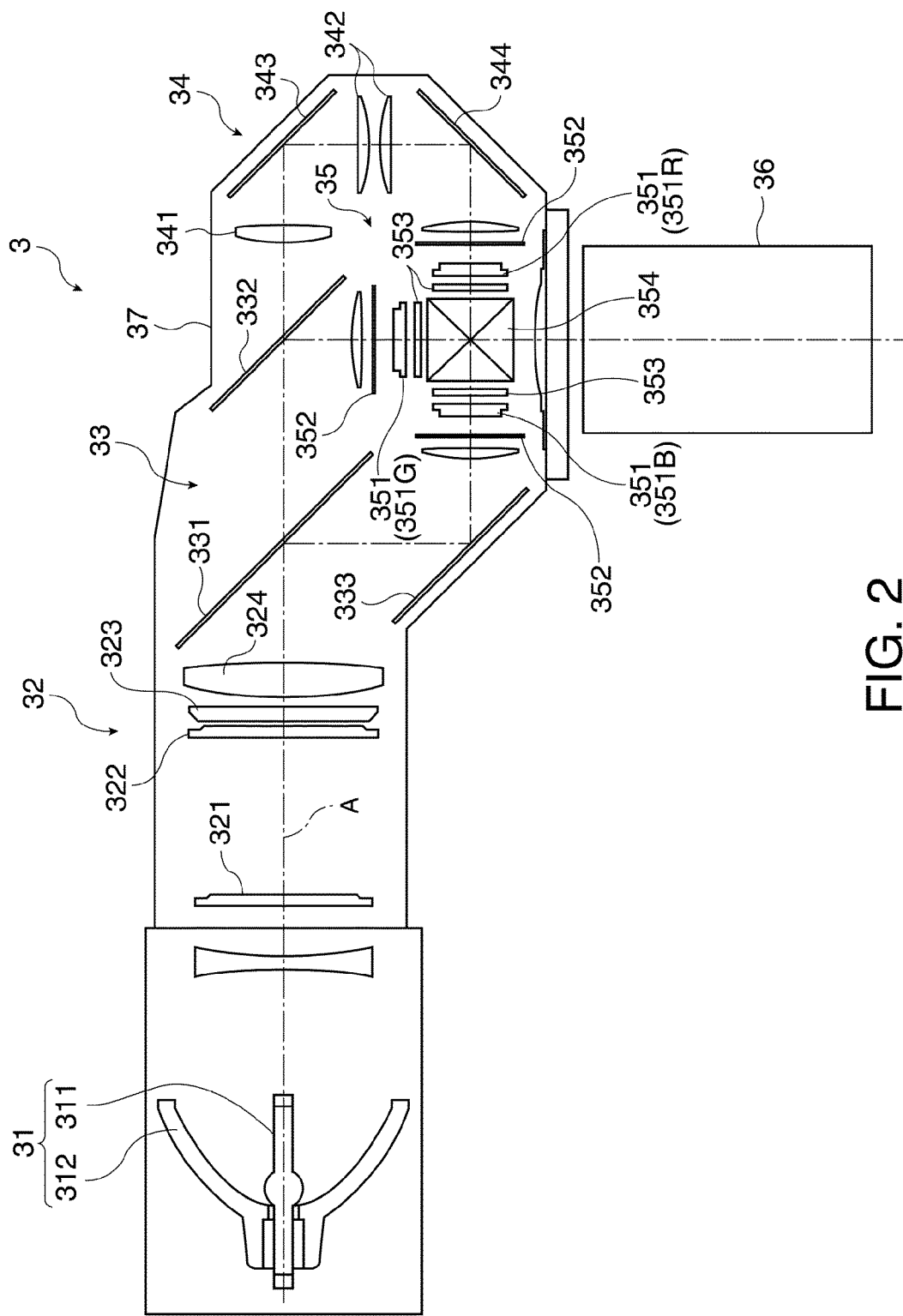
FIG. 2 schematically shows the configuration of an optical unit in the embodiment.

FIG. 2 is a view schematically showing the configuration of the optical unit 3.

The optical unit 3 modulates a light emitted from a light source in accordance with image information and magnifies and projects the luminous flux under the control of the control device 6. The optical unit 3 has a light source 31, an illumination device 32, a color separation device 33, a relay device 34, an optical device 35, a projection lens 36 as a projection device, and an optical component casing 37, as shown in FIG. 2. Since the optical components 31 to 37 are used as in the optical system of various general projectors, these optical components will be briefly described hereinafter.

The light source 31 has a light source lamp 311 and a reflector 312. The illumination device 32 has lens arrays 321 and 322, a polarization conversion element 323, and a superimposing lens 324. The color separation device 33 has dichroic mirrors 331 and 332, and a reflection mirror 333. The relay device 34 has a light incident-side lens 341, a relay lens 342, and reflection mirrors 343 and 344. The optical device 35 has three liquid crystal panels 351 as light modulation devices that modulate a light emitted from the light source 31 in accordance with image information under the control device 6 (the liquid crystal panel on the red light side is referred to as liquid crystal panel 351R, the liquid crystal panel on the green light side is referred to as liquid crystal panel 351G, and the liquid crystal panel on the blue light side is referred to as liquid crystal panel 351B), three light incident-side polarizers 352, three light exiting-side polarizers 353, and a cross dichroic prism 354 as a color combining system which combines the luminous flux modulated by the three liquid crystal panels 351 and thus forms image light (color image). The projection lens 36 magnifies and projects the image light. The optical component casing 37 supports and fixes these optical components 31 to 36 at predetermined positions with respect to an illumination axis A that is set inside.

Configuration of Projection Direction Change Unit

Figure 3:
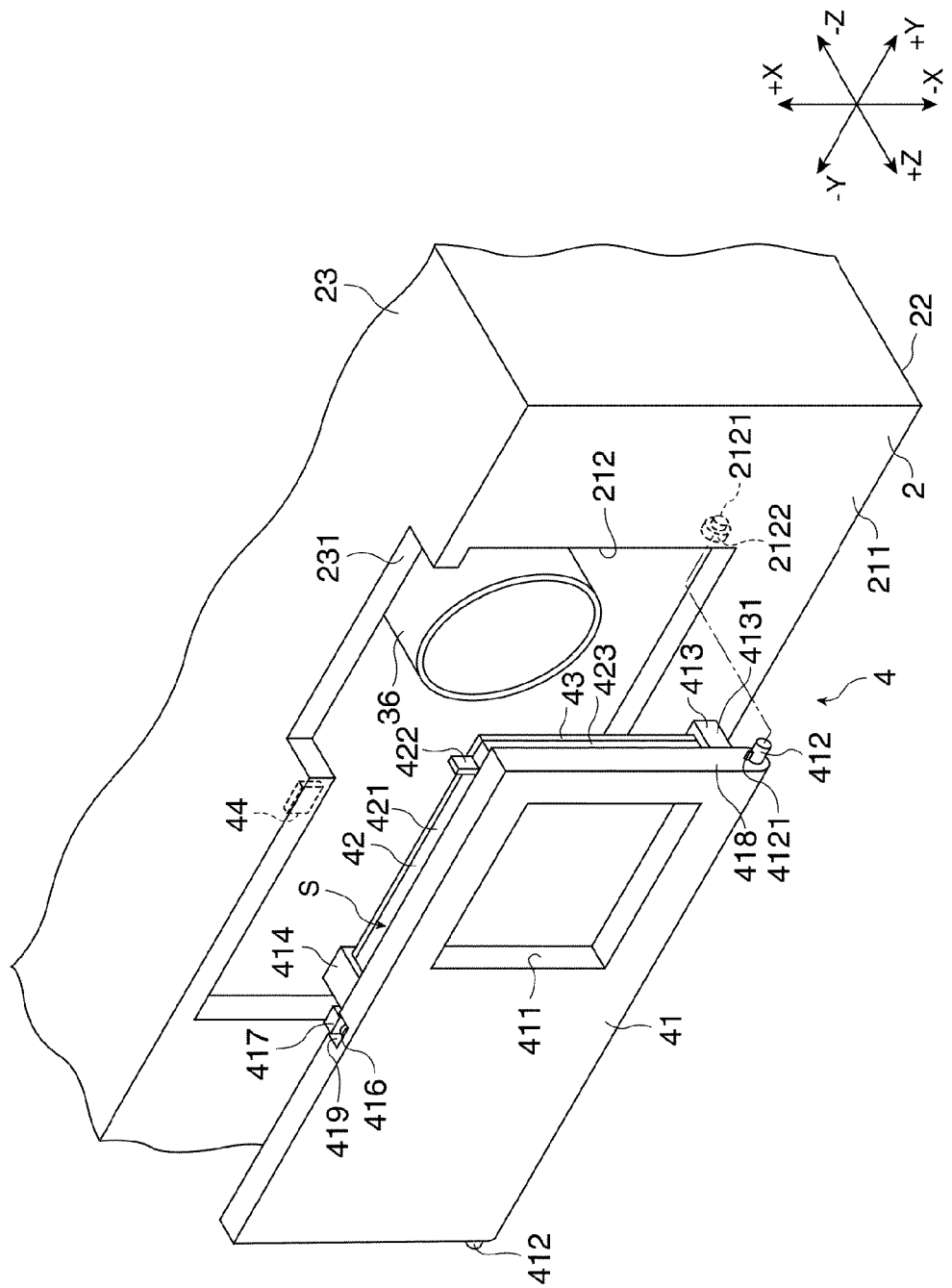
FIG. 3 is a perspective view showing a projection direction change unit in the embodiment, as a partially exploded view.

FIG. 3 is a perspective view showing a part of the projection direction change unit 4 as an exploded view.

The projection direction change unit 4 changes the light exiting direction of image light from the projector 1. This projection direction change unit 4 has a cover 41, a lens shutter 42, a reflection mirror 43, and a stopper canceling pawl 44, as shown in FIG. 3.

The cover 41 has a second opening 411 which passes image light from the projection lens 36. The cover 41 is provided rotatably in an off-plane direction with respect to the light exiting surface 211 and opens and closes the first opening 212. The cover 41 also holds the lens shutter 42 slidably along the inner surface. This cover 41 has a pair of rotary shafts 412, a first rail part 413, a second rail part 414, a pair of spacer parts 415 (see FIG. 4), an energizing member 416, and a stopper 417.

The rotary shafts 412 are formed toward the −X axis direction on the two lateral surfaces 418 of the cover 41, respectively. At a proximal part of these rotary shafts 412, a protrusion 4121 is formed which protrudes in an off-plane direction from the outer peripheral surface of the proximal part. The cover 41 is provided in such a manner that the cover 41 becomes rotatable as these rotary shafts 412 are housed in housing holes 2121 formed in the inner wall surface of the first opening 212. In the housing holes 2121, a retaining part 2122 is formed which protrudes in an off-plane direction from the inner peripheral surface of the housing holes 2121. As the protrusions 4121 are abutted against the retaining parts 2122, the cover 41 can be retained in an inclined state with respect to the optical axis (center axis) of the image light emitted from the projection lens 36. The retaining mechanism to retain the cover 41 in an oblique state is not limited to the mechanism of this embodiment having the protrusions 4121 and the retaining parts 2122. Other appropriate configurations may also be employed.

The opening and closing state of the cover 41 with respect to the first opening 212 is detected by a first detection unit 71 (see FIG. 9) which uses a mechanism switch, MR (magnetoresistive) element or photointerruptor, and is outputted to the control device 6.

The first rail part 413 is provided toward the −X axis direction and along the longitudinal direction of the cover 41, on the inner surface of the cover 41. The first rail part 413, together with the second rail part 414, as will be described later, holds the lens shutter 42 slidably along the inner surface of the cover 41 and in a manner that enables the lens shutter 42 to open and close the second opening 411. Specifically, as the lens shutter 42 is abutted against an edge 4131 of the first rail part 413 in the +Y axis direction, the first and second rail parts 413 and 414 hold the lens shutter 42 at the position where the lens shutter 42 closes the second opening 411, as shown in FIG. 3. Meanwhile, as the lens shutter 42 is abutted against an edge 4132 of the first rail part 413 in the −Y axis direction (see FIG. 5), the first and second rail parts 413 and 414 hold the lens shutter 42 at the position where the lens shutter 42 opens the second opening 411.

The second rail part 414 is provided toward the +X axis direction on the inner surface of the cover 41. The second rail part 414 is formed at a position and with a size that enable the second rail part 414 to constantly hold the edge of the lens shutter 42 on the +X axis side when the lens shutter 42 slides between the position where the lens shutter 42 closes the second opening 411 (the position where the lens shutter 42 is abutted against the edge 4131 of the first rail part 413 in the +Y axis direction; the same applies to the description below) and the position where the lens shutter 42 opens the second opening 411 (the position where the lens shutter 42 is abutted against the edge 4132 of the first rail part 413 in the −Y axis direction; the same applies to the description below).

The spacer parts 415 (see FIG. 4) are provided along the longitudinal direction of the cover 41 at a height position where the spacer part 415 does not interfere with the stopper canceling pawl 44 in the +X axis direction and at a position toward the −X axis direction on the inner surface of the cover 41. The spacer parts 415 thus form a space S which the stopper canceling pawl 44 can enter, between the lens shutter 42 and the cover 41.

On the edge of the cover 41 toward the +X axis direction, a recess part 419 is formed at a position slightly toward the −Y axis direction from the edge in the −Y axis direction of the lens shutter 42 located at the position where the lens shutter 42 closes the second opening 411, as shown in FIG. 3. The recess part 419 has a size large enough to house the stopper 417 and the compressed energizing member 416.

The energizing member 416 is a spring with its one end fixed to the inner wall surface of the recess part 419 and is provided along the Z axis direction within the recess part 419.

The stopper 417 is formed in the shape of a block and is connected to the other end of the energizing member 416.

When the cover 41 is in the state of opening the first opening 212, the stopper 417 is energized by the energizing member 416, thus protrudes from within the recess part 419 and is located at position away from the inner surface of the cover 41 as will be described later. Thus, the stopper 417 regulates the movement of the lens shutter 42 from the position where the lens shutter 42 closes the second opening 411 toward the position where the lens shutter 42 opens the second opening 411.

The lens shutter 42 is formed in the shape of a rectangular plate. The lens shutter 42 is provided slidably along the inner surface of the cover 41 and opens and closes the second opening 411, as described above. A knob 422 is provided on an end surface 421 on the side of the +X axis direction of the lens shutter 42. The knob 422 is arranged within the cut-out 231 when the cover 41 closes the first opening 212. In this embodiment, the lens shutter 42 is slid by using this knob 422.

The opening and closing state of the lens shutter 42 with respect to the second opening 411 is detected by a second detection unit 72 (see FIG. 9) which uses a mechanical switch, MR (magneto-resistive) element or photointerruptor and is outputted to the control device 6.

The reflection mirror 43 is provided on the inner surface of the lens shutter 42. When the cover 41 opens the first opening 212 and the lens shutter 42 closes the second opening 411, the reflection mirror 43 reflects the image light from the projection lens 36, as will be described later.

Hereinafter, "the cover 41 opens the first opening 212" is simply referred to as "the cover 41 opens (or is opened)", and "the cover 41 closes the first opening 212" is simply referred to as "the cover 41 closes (or is closed)". Similar descriptions are used for the opening and closing state of the lens shutter 42 with respect to the second opening 411.

The stopper canceling pawl 44 is formed in the shape of a plate and protrudes inward of the first opening 212 from the peripheral edge of the first opening 212. When the cover 41 and the lens shutter 42 are closed, the stopper canceling pawl 44 is not located between the lens shutter 42 and the cover 41. When the cover 41 is closed and the lens shutter 42 is slid from the position where the lens shutter 42 closes the second opening 411 to the position where the lens shutter 42 opens the second opening 411, the stopper canceling pawl 44 is formed at position located between the lens shutter 42 and the cover 41.

When the cover 41 is closed and the lens shutter 42 is opened, the stopper canceling pawl 44 is located between the lens shutter 42 and the cover 41 and functions as a lock pawl and a first lock mechanism to regulate the opening of the cover 41 by hooking the lens shutter 42, as will be described later.

Meanwhile, when the cover 41 is closed while the stopper 417 keeps regulating the lens shutter 42 at the closing position, the stopper canceling pawl 44 presses the stopper 417 toward the cover 41 and causes the stopper 417 to be arranged in the recess part 419, thus canceling the regulation, as will be described later. As the stopper canceling pawl 44, the energizing unit 416 and the stopper 417 are provided, a second lock mechanism is formed which regulates the movement of the lens shutter 42 toward the opening position when the cover 41 is opened and the lens shutter 42 is closed, and which cancels the regulation when the cover 41 is closed and the lens shutter 42 is opened, and when the cover 41 is closed and the lens shutter 42 is closed.

Operation of Projection Direction Change Unit

Hereinafter, the operation of the projection direction change unit 4 will be described.

Figure 4:
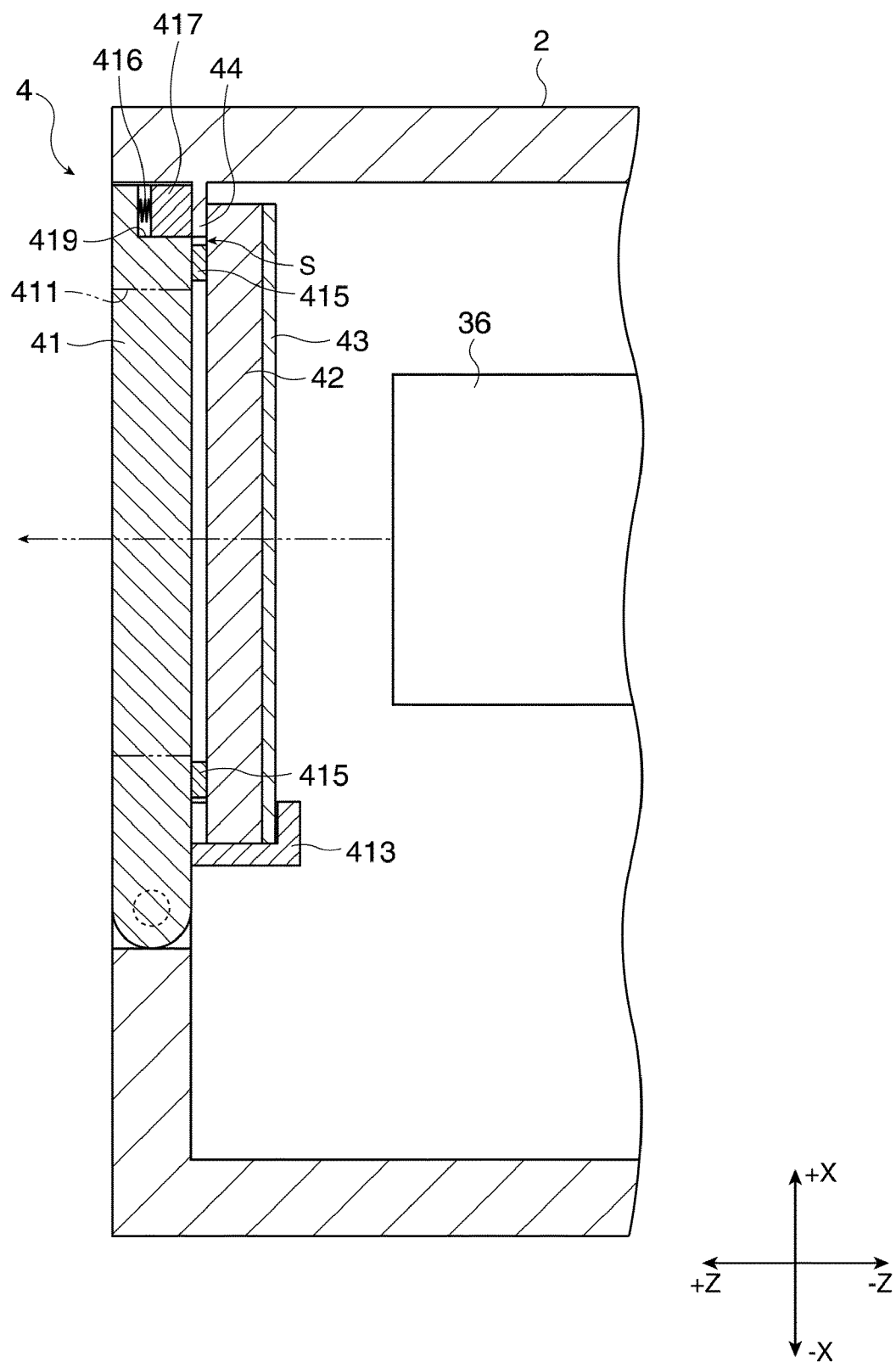
FIG. 4 is a sectional view showing the projection direction change unit at the time of normal projection in the embodiment.
Figure 5:
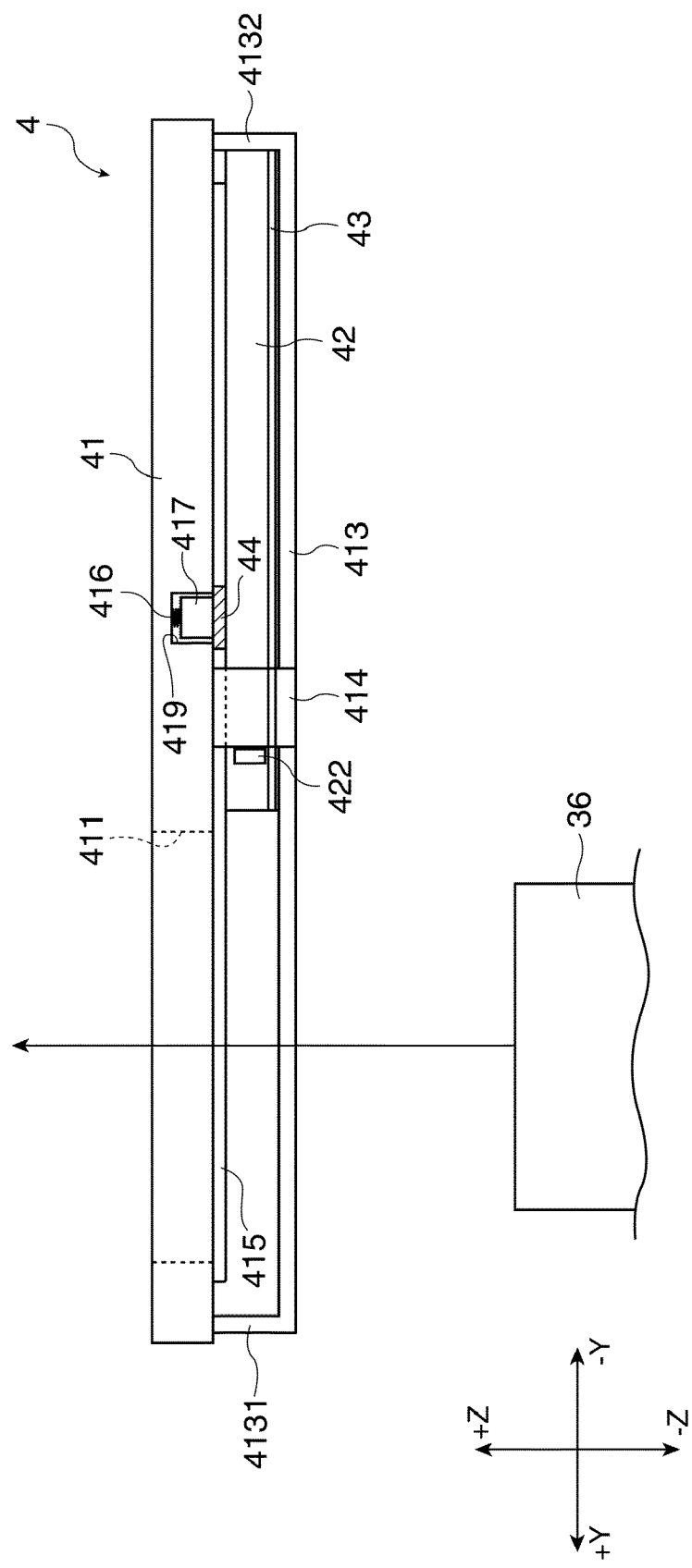
FIG. 5 is a plan view showing the projection direction change unit at the time of normal projection in the embodiment.

FIG. 4 is a sectional view showing the projection direction change unit 4 at the time of normal projection. FIG. 5 is a plan view showing the projection direction change unit 4 at the time of normal projection.

In the projector 1 according to this embodiment, at the time of normal projection in which image light from the projection lens 36 is emitted outward from the projector 1 without changing the traveling direction of the image light, the projector 1 is used in a first state where the cover 41 is closed and the lens shutter 42 is opened, as shown in FIG. 4 and FIG. 5. Thus, the image light emitted from the projection lens 36 can be emitted outward from the projector 1 via the second opening 411 without changing the traveling direction of the image light. Therefore, as the projector 1 is placed on a horizontal surface such as a desk, image light can be projected to a screen or wall surface arranged to the forward side of the projector 1.

In this normal projection (the first state), the stopper canceling pawl 44 is located between the cover 41 and the lens shutter 42. Therefore, the lens shutter 42 is hooked on the stopper canceling pawl 44 and this regulates the opening of the cover 41 holding the lens shutter 42. Also, since the stopper 417 is pressed toward the cover 41 by the stopper canceling pawl 44 and is arranged in the recess part 419, the lens shutter 42 becomes slidable.

Figure 6:
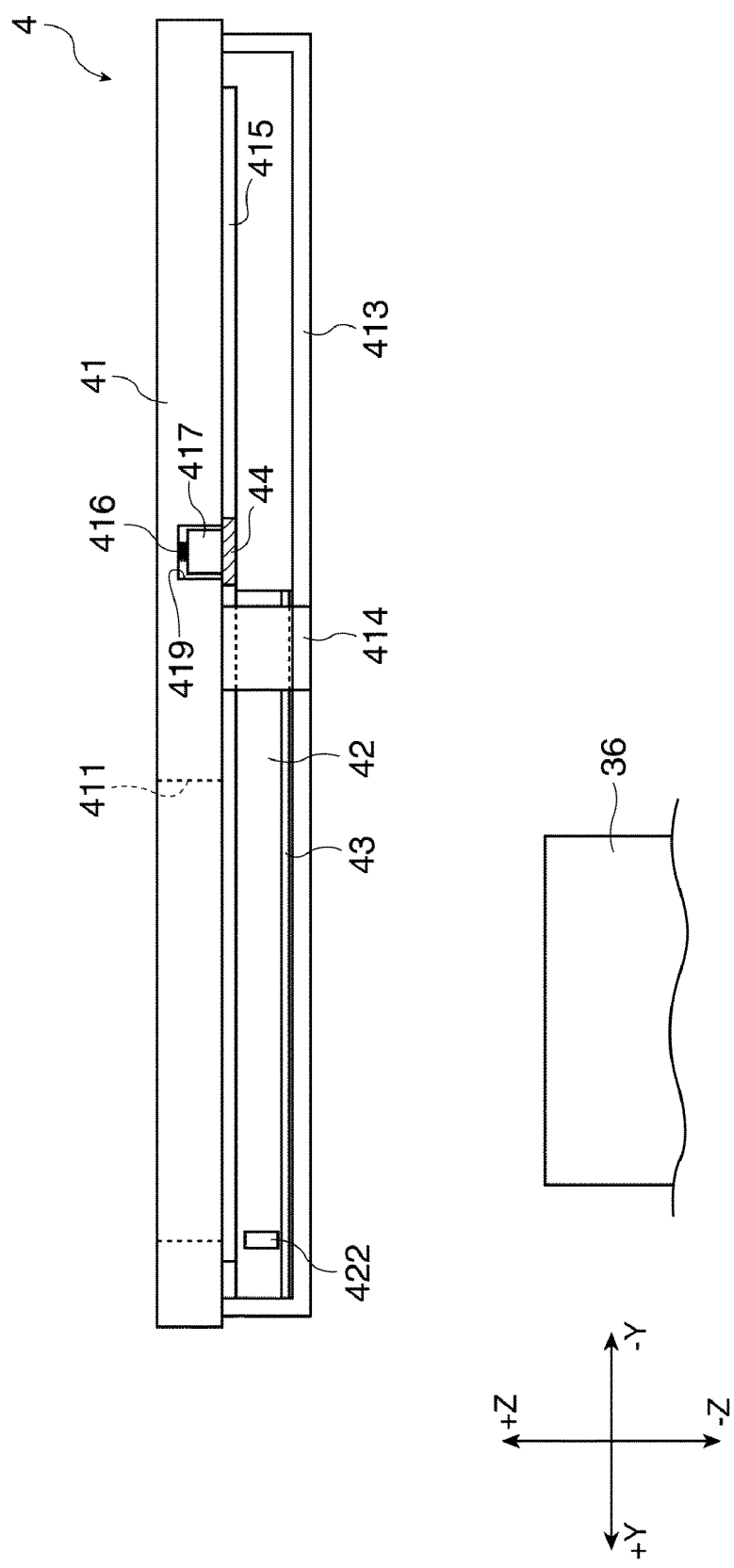
FIG. 6 is a plan view showing the projection direction change unit at the time of modified projection in the embodiment.

FIG. 6 is a plan view showing the projection direction change unit 4 at the time of modified projection.

In the case of switching from normal projection as described above to modified projection in which image light from the projection lens 36 is emitted outward from the projector 1 with the traveling direction of the image light changed, first, the lens shutter 42 is moved by using the knob 422 from the position where the lens shutter 42 opens the second opening 411 to the position where the lens shutter 42 closes the second opening 411, and a third state is created where both the cover 41 and the lens shutter 42 are closed as shown in FIG. 6. Thus, the stopper canceling pawl 44 exits from between the cover 41 and the lens shutter 42 and this enables the cover 41 to open.

Figure 7:
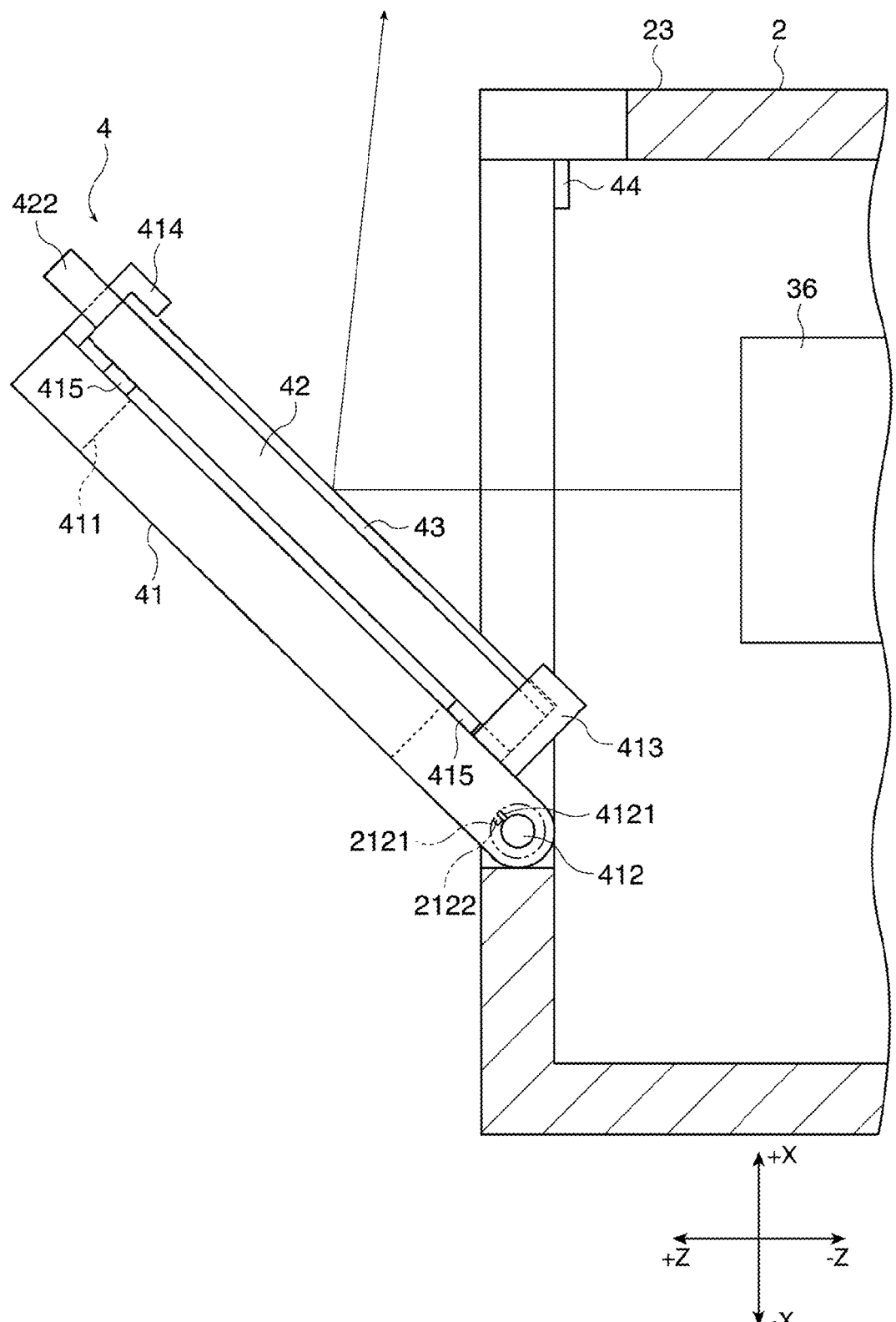
FIG. 7 is a side view showing the projection direction change unit at the time of modified projection in the embodiment.
Figure 8:
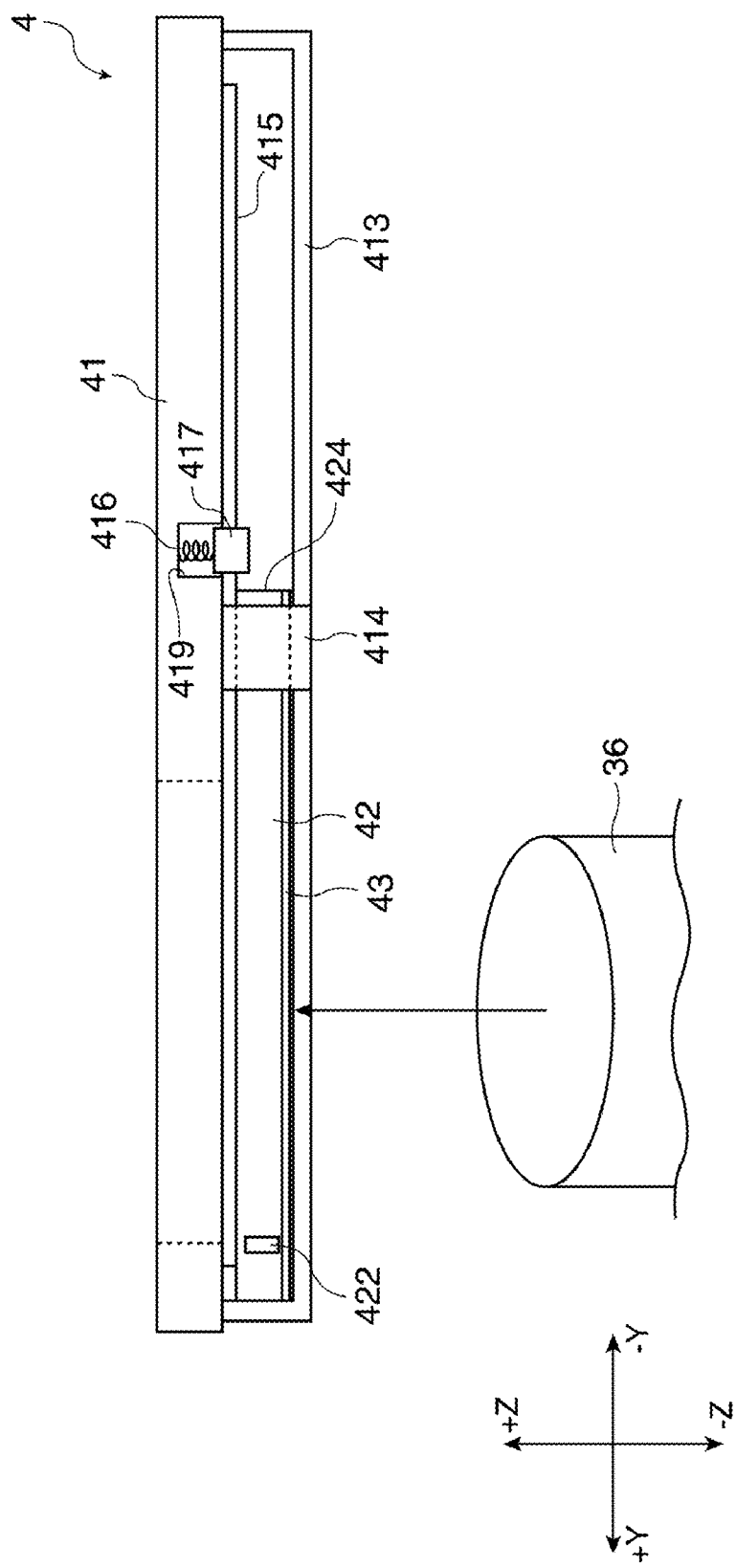
FIG. 8 is a plan view showing the projection direction change unit at the time of modified projection in the embodiment.

FIG. 7 is a side view showing the projection direction change unit 4 at the time of modified projection. FIG. 8 is a plan view showing the projection direction change unit 4 at the time of modified projection.

Then, in this third state, the cover 41 is opened to a position where the cover 41 is retained in an inclined state, and a second state is thus created where the cover 41 is opened and the lens shutter 42 is closed, as shown in FIG. 7. In this case, as the cover 41 shifts from the closed state to the open state, the stopper 417 is energized by the energizing member 416 and protrudes from within the recess part 419. Thus, the stopper 417 regulates the movement of the lens shutter 42 toward the position where the lens shutter 42 opens the second opening 411, as shown in FIG. 8.

Thus, the image light emitted from the projection lens 36 can be securely reflected by the reflection mirror 43. The image light from the projection lens 36 can be emitted outward from the projector 1 with the traveling direction of the image light changed. Therefore, as the projector 1 is placed on a horizontal surface such as a desk and modified projection is carried out, image light can be projected to the ceiling.

In the case of switching from such modified projection to normal projection again, first, the cover 41 is closed and the third state is created where both the cover 41 and the lens shutter 42 are closed. In this third state, the stopper 417 is pressed toward the cover 41 by the stopper canceling pawl 44 and is arranged in the recess part 419. Therefore, the regulation of the lens shutter 42 by the stopper 417 is canceled and the lens shutter 42 becomes slidable. Then, the lens shutter 42 is moved by using the knob 422 to the position where the lens shutter 42 opens the second opening 411, and the first state is created where the cover 41 is closed and the lens shutter 42 is opened. Thus, image light emitted from the projection lens 36 can be emitted outward from the projector 1 via the second opening 411 without changing the traveling direction of the image light, and the projection mode can be switched to normal projection.

When the lens shutter 42 is slid from the position where the lens shutter 42 closes the second opening 411 to the position where the lens shutter 42 opens the second opening 411, the stopper canceling pawl 44 is located between the lens shutter 42 and the cover 41. Therefore, the lens shutter 42 is hooked on the stopper canceling pawl 44 and this regulates the opening of the cover 41, as described above.

Configuration of Operation Unit

Figure 9:
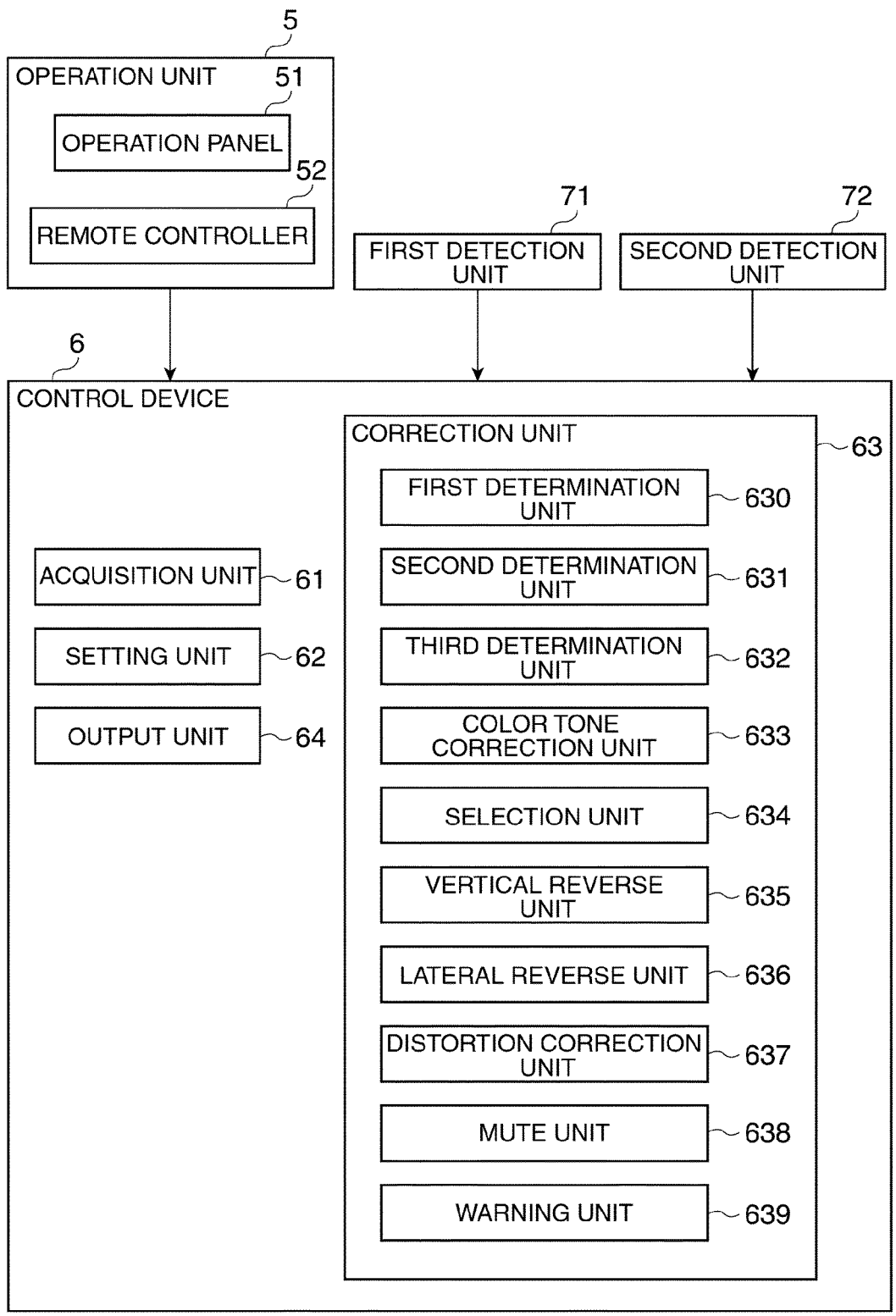
FIG. 9 shows the configuration of a control device in the embodiment.

The operation unit 5 includes an operation panel 51 and a remote controller 52 (see FIG. 9). The operation unit 5 outputs an operation signal corresponding to a user's input operation to the control device 6. As the operation unit 5 is operated by the user, the mode of the projector 1 with respect to the direction of the image is set to one of a vertical reverse mode for vertically reversing the image and a lateral reverse mode for laterally reversing the image.

Configuration of Control Device

FIG. 9 shows the configuration of the control device 6.

The control device 6 is configured as a circuit board on which a CPU (central processing unit) and a storage device are mounted. The control device 6 controls the entire projector 1. The control device 6 also automatically corrects the direction and color tone of the image in accordance with the switching between normal projection and modified projection. The control device 6 has an acquisition unit 61, a setting unit 62, a correction unit 63, and output unit 64, as shown in FIG. 9.

The acquisition unit 61 acquires image information according to a display image from a personal computer or the like connected to the projector 1.

The setting unit 62 sets the mode of the projector 1 with respect to the direction of the image to one of the vertical reverse mode for vertically reversing the image and the lateral reverse mode for laterally reversing the image in accordance with the user's operation of the operation unit 5.

The output unit 64 outputs image information corrected by the correction unit 63, which will be described later, to the liquid crystal panels 351.

The correction unit 63 corrects image information. The correction unit 36 has a first determination unit 630, a second determination unit 631, a third determination unit 632, a color tone correction unit 633, a selection unit 634, a vertical reverse unit 635, a lateral reverse unit 636, a distortion correction unit 637, a mute unit 638, and a warning unit 639.

The first determination unit 630 determines whether it is a fourth state where both the cover 41 and the lens shutter 42 are opened, or not, on the basis of the opening and closing state of the cover 41 and the lens shutter 42 detected by the first and second detection units 71 and 72.

If the first determination unit 630 determines that it is not the fourth state where both the cover 41 and the lens shutter 42 are opened, the second determination unit 631 determines whether it is the third state where both the cover 41 and the lens shutter 42 are closed, or not.

If the second determination unit 631 determines that it is not the third state where both the cover 41 and the lens shutter 42 are closed, the third determination unit 632 determines whether it is modified projection (the second state) where the cover 41 is opened and the lens shutter 42 is closed, or not (normal projection (the first state) where the cover 41 is closed and the lens shutter 42 is opened).

The color tone correction unit 633 corrects the color tone of the image information to color tone corresponding to a projection target surface in accordance with the determination by the third determination unit 632. Specifically, if the third determination unit 632 determines that it is the state of modified projection (ceiling projection) where the cover 41 is opened and the lens shutter 42 is closed, the color tone correction unit 633 corrects the color tone of the image information to color tone corresponding to the ceiling. Meanwhile, if the third determination unit 632 determines that it is normal projection in which the cover 41 is closed and the lens shutter 42 is opened, the color tone correction unit 633 corrects the color tone of the image information to color tone corresponding to the screen.

If the third determination unit 632 determines that it is modified projection, the selection unit 634 causes one of the vertical reverse unit 635 and the lateral reverse unit 636 to function, which will be described later. Specifically, if the mode of the projector 1 with respect to the direction of the image is set to the vertical reverse mode, the selection unit 634 causes the vertical reverse unit 635 to function. If the mode of the projector 1 with respect to the direction of the image is set to the lateral reverse mode, the selection unit 634 causes the lateral reverse unit 636 to function.

Figure 10:
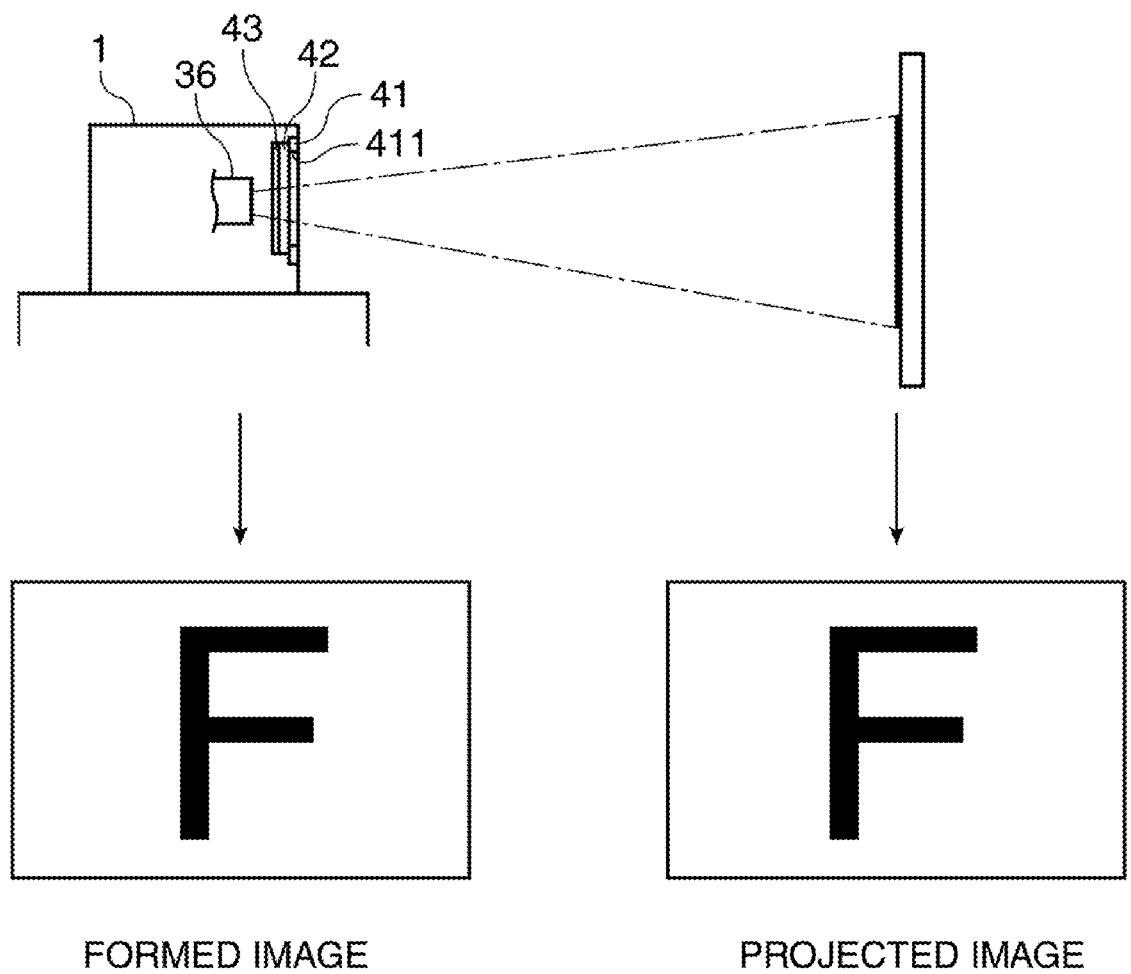
FIG. 10 shows a projected image projected on a screen in the embodiment.
Figure 11:
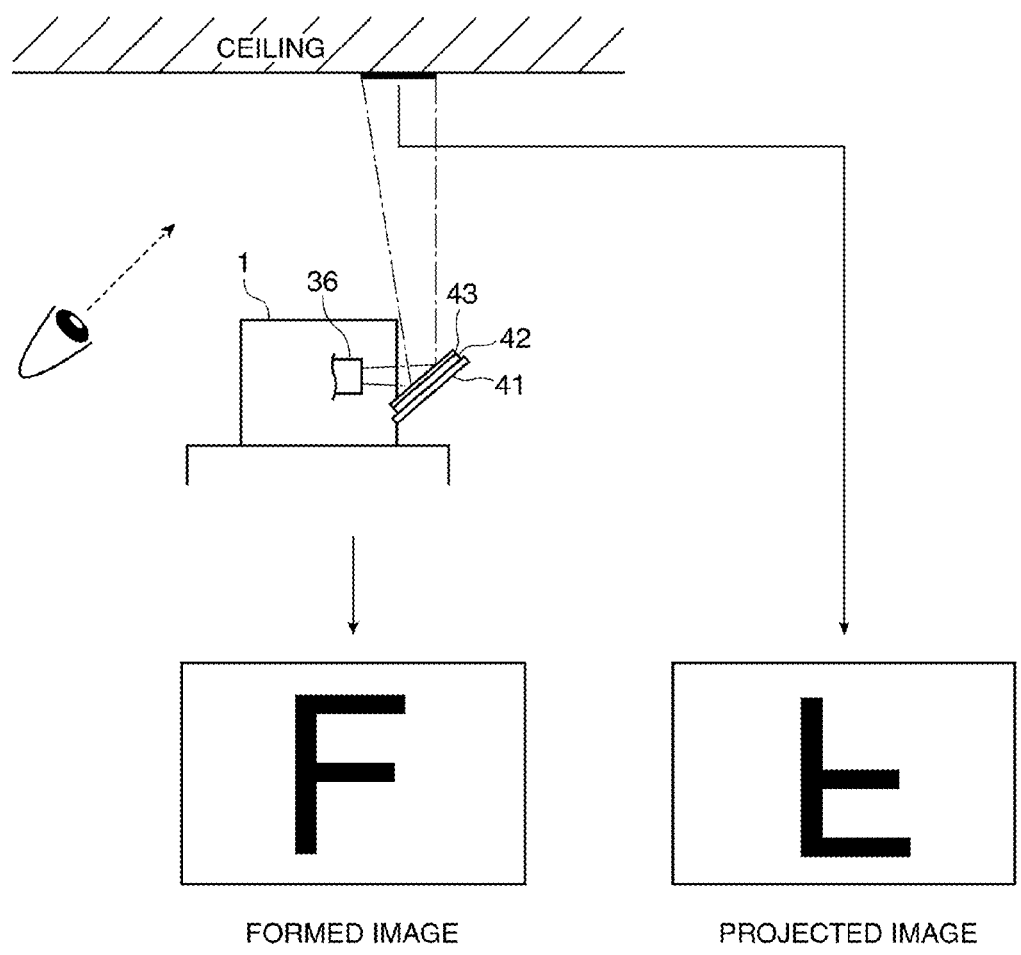
FIG. 11 shows a projected image projected on the ceiling in the embodiment.

FIG. 10 shows a projected image projected on the screen. FIG. 11 shows a projected image in the case where the user views the projected image projected on the ceiling when the user's body faces the light exiting direction of image light from the projection lens 36. In FIG. 11, and FIG. 12 to FIG. 14, as will be described later, it is assumed that the projected image has no distortion.

In normal projection in which a formed image formed by the liquid crystal panels 351 is projected onto a screen situated to the forward side of the projector 1, as shown in FIG. 10, a projected image having the same vertical and lateral directions as the formed image is formed on the screen. However, in modified projection in which image light (formed image) emitted from the projection lens 36 is reflected by the reflection mirror 43 and then projected onto the ceiling, as shown in FIG. 11, if the user views the projected image projected on the ceiling when the user's body faces the light exiting direction of the image light from the projection lens 36, the vertical direction of the projected image is reversed from the vertical direction of the formed image.

Figure 12:
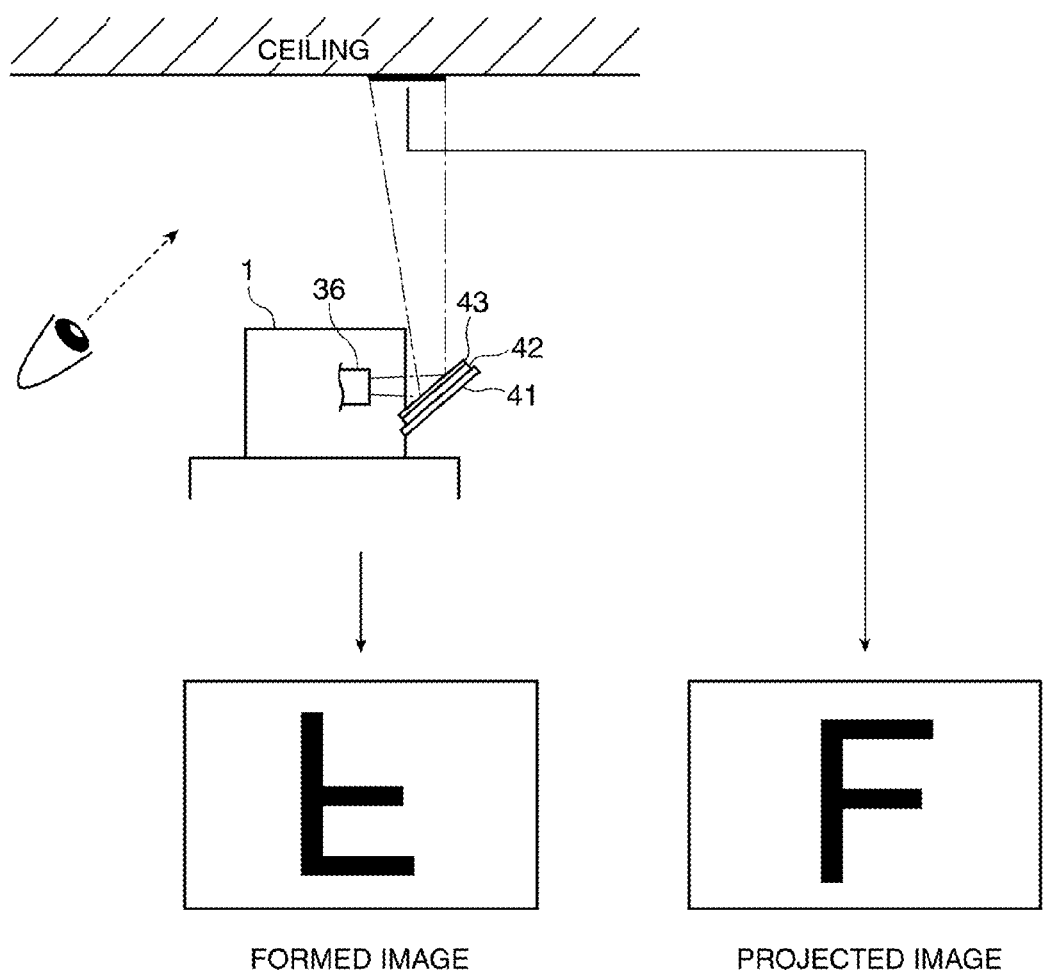
FIG. 12 shows an image according to image information corrected by a vertical reverse unit in the embodiment.

FIG. 12 shows a formed image according to image information corrected by the vertical reverse unit.

Thus, if the third determination unit 632 determines that it is modified projection and the projector 1 is set in the vertical reverse mode, the vertical reverse unit 635 functions via the selection unit 634 and further corrects the image information corrected by the color tone correction unit 633 so that the vertical direction of the image formed by the liquid crystal panels 351 is reversed from the vertical direction of the image formed on the basis of the image information before correction, as shown in FIG. 12. Thus, the image having the correct vertical direction to the user can be formed on the ceiling.

Figure 13:
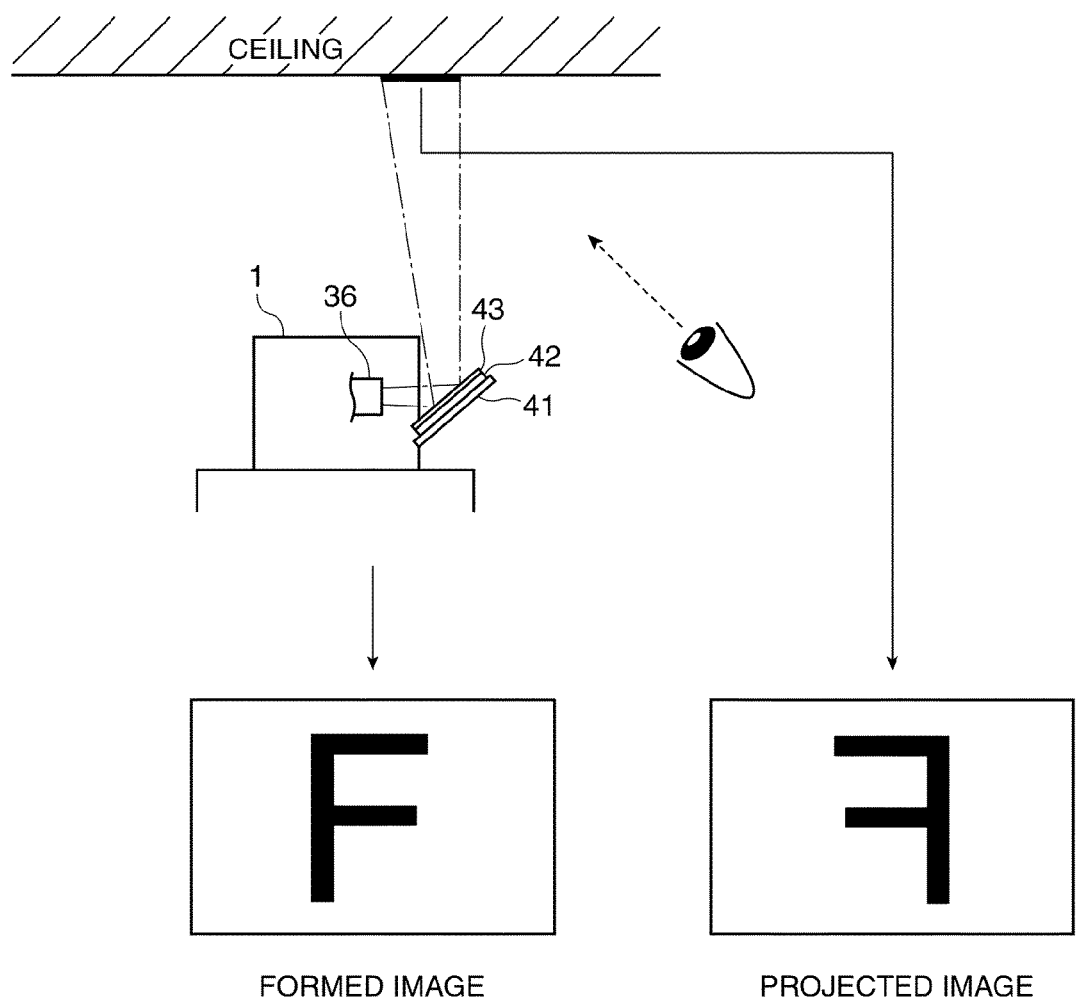
FIG. 13 shows a projected image projected on the ceiling in the embodiment.
Figure 14:
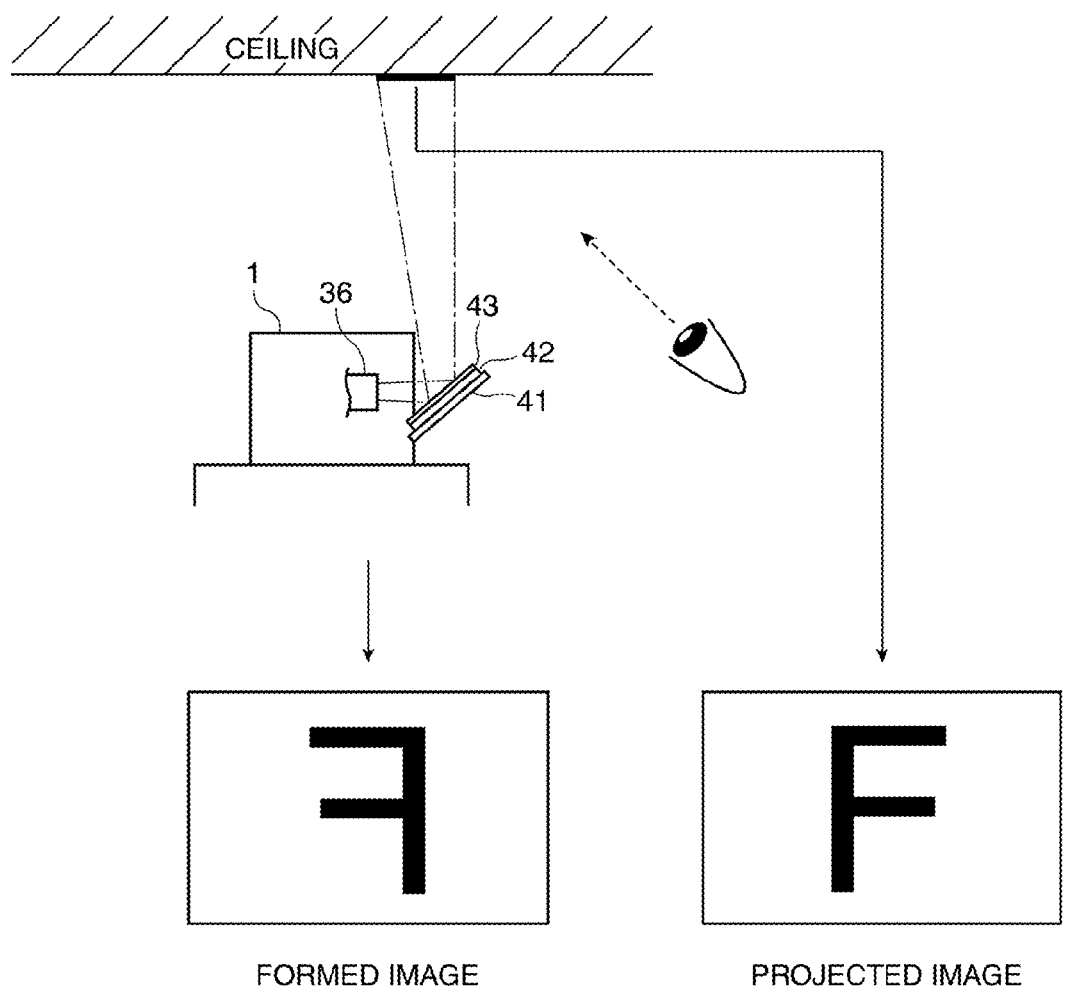
FIG. 14 shows an image according to image information corrected by a lateral reverse unit in the embodiment.

FIG. 13 shows a projected image that is projected on the ceiling and viewed by the user when the user's body faces the direction opposite to the light exiting direction of image light from the projection lens 36. FIG. 14 shows a formed image according to image information corrected by the lateral reverse unit 636.

Meanwhile, in modified projection, if the user views a projected image formed on the ceiling when the user's body faces the direction opposite to the light exiting direction of image light from the projection lens 36, as shown in FIG. 13, the lateral direction of the projected image is reversed from the lateral direction of the formed image.

Thus, if the third determination unit 632 determines that it is modified projection and the projector 1 is set in the lateral reverse mode, the lateral reverse unit 636 functions via the selection unit 634 and further corrects the image information corrected by the color tone correction unit 633 so that the lateral direction of the image formed by the liquid crystal panels 351 is reversed from the lateral direction of the image formed on the basis of the image information before correction, as shown in FIG. 14. Thus, the image having the correct lateral direction to the user can be formed on the ceiling.

Figure 15:
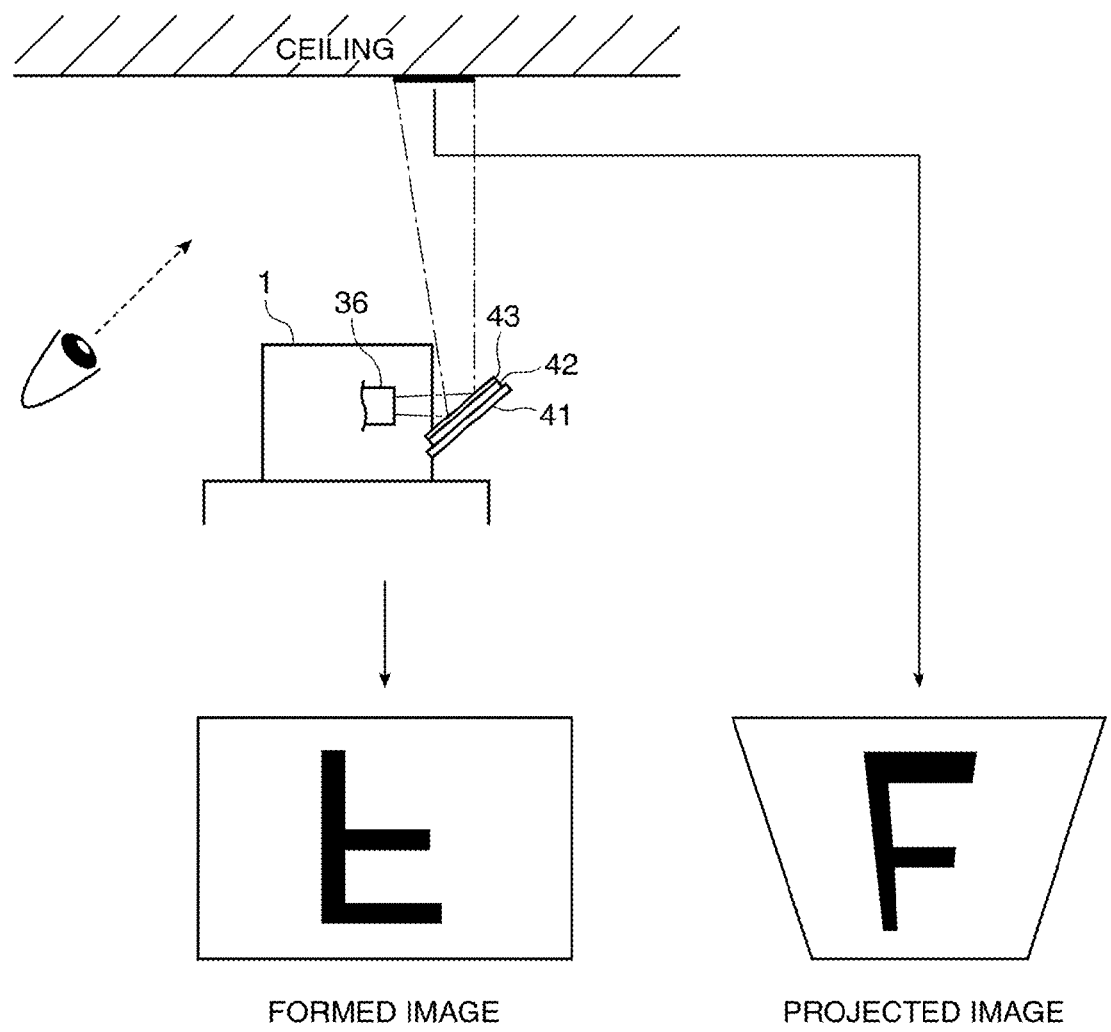
FIG. 15 shows distortion in a projected image in the embodiment.
Figure 16:
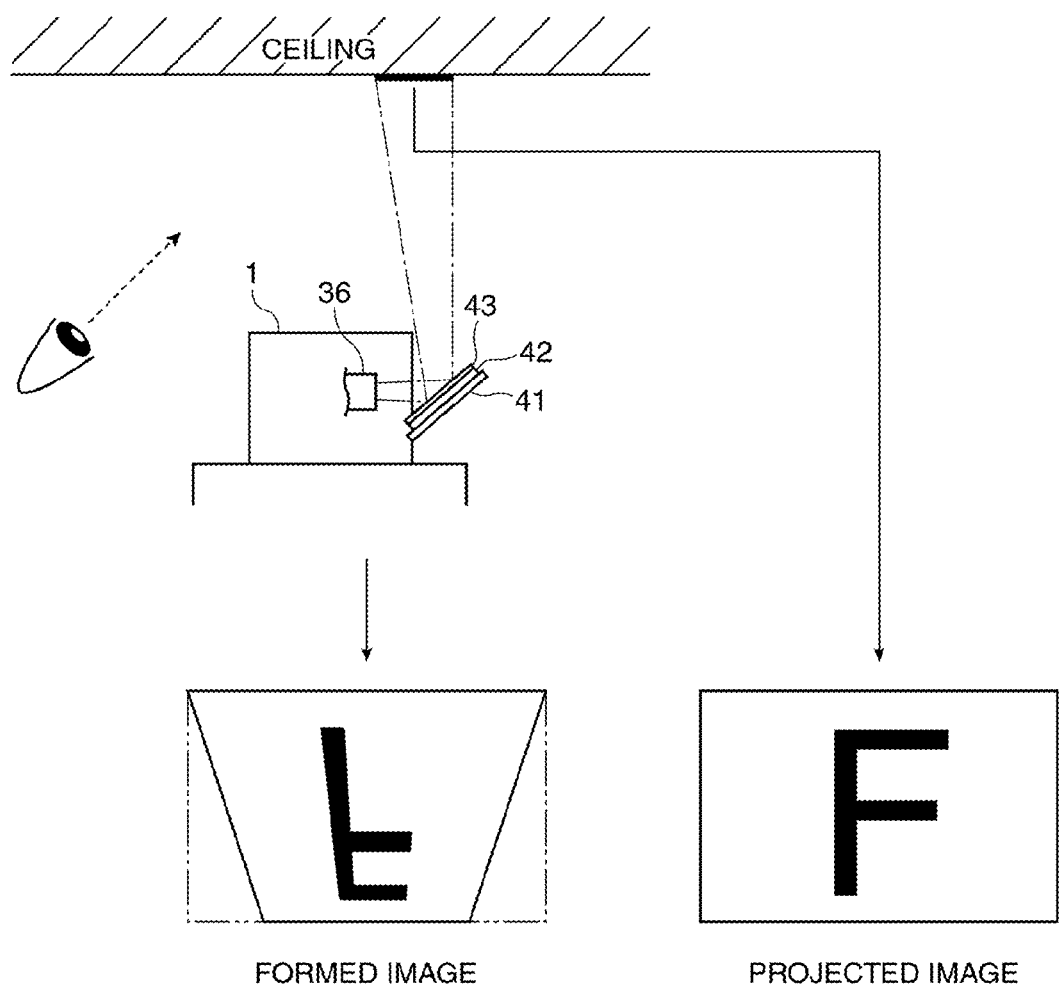
FIG. 16 shows a formed image according to image information corrected by a distortion correcting unit in the embodiment.

FIG. 15 shows a distortion in a projected image generated by the reflection by the reflection mirror 43. FIG. 16 shows a formed image according to image information corrected by the distortion correction unit 637.

In the projector 1 according to this embodiment, image light that is horizontally emitted from the projection lens 36 is reflected upward by the reflection mirror 43 and the image light is then projected onto the ceiling. Therefore, a keystone distortion is generated in the projected image as shown in FIG. 15, depending on the angle of the reflection mirror 43 with respect to the center axis of the image light emitted from the projection lens 36.

Thus, if the third determination unit 632 determines that it is modified projection, the distortion correction unit 637 further corrects (performs keystone correction on) the image information corrected by the units 633, 635 and 636 in order to prevent the generation of a keystone distortion in the image projected on the ceiling, as shown in FIG. 16. Thus, the distortion in the projected image projected on the ceiling can be restrained.

The setting of the amount of correction of keystone distortion by the distortion correction unit 637 and the setting of the amount of correction of color tone in normal projection and modified projection by the color tone correction unit 633 can be changed by the user operating the operation unit 5.

If the second determination unit 631 determines that it is the third state where both the cover 41 and the lens shutter 42 are closed, the mute unit 638 generates image information to be displayed in black by the liquid crystal panels 351 and causes the liquid crystal panels 351 to perform black display. The mute unit 638 also shifts the output state of the light source lamp 311 to a low-output state. Thus, the reflection mirror 43, the lens shutter 42 and the cover 41 are prevented from reaching high temperatures because of the irradiation of the reflection mirror 43 with image light from the projection lens 36.

If a speaker, not shown, provided within the exterior casing 2 or the like outputs a sound corresponding to a projected image, the mute unit 638 also has the function of stopping the speaker from outputting the sound. Moreover, the mute unit 638 may also be configured to measure the elapsed time after the second determination unit 631 determines that it is the third state where both the cover 41 and the lens shutter 42 are closed, and then turn off the light source lamp 311 if this determination continues for a predetermined time or longer.

Here, in this embodiment, in the state where the cover 41 is closed, the first lock mechanism having the stopper canceling pawl 44 prevents the cover 41 from opening unless the lens shutter 42 is closed. If the third state where both the cover 41 and the lens shutter 42 are closed is shifted to modified projection (the second state) by opening the cover 41, the second lock mechanism having the stopper canceling pawl 44, the energizing member 416 and the stopper 417 regulates the movement of the lens shutter 42 toward the side where the lens shutter 42 opens the second opening 411. Thus, in this embodiment, the fourth state where both the cover 41 and the lens shutter 42 are opened cannot occur in the normal state of use.

However, if the first determination unit 630 determines by any chance that it is the fourth state where both the cover 41 and the lens shutter 42 are opened, the warning unit 639 warns the user by turning on a warning lamp, not shown, provided on the exterior casing 2 or by causing a speaker, not shown, provided in the exterior casing 2 or a speaker, not shown, connected to the projector 1 to output a warning sound. Thus, even if the fourth state where both the cover 41 and the lens shutter 42 are opened occurs by any chance, the user can press the stopper 417, arrange the stopper 417 within the recess part 419 and close the lens shutter 42, thereby restoring the normal state of the projector 1.

Flow of Adjustment Processing

Figure 17:
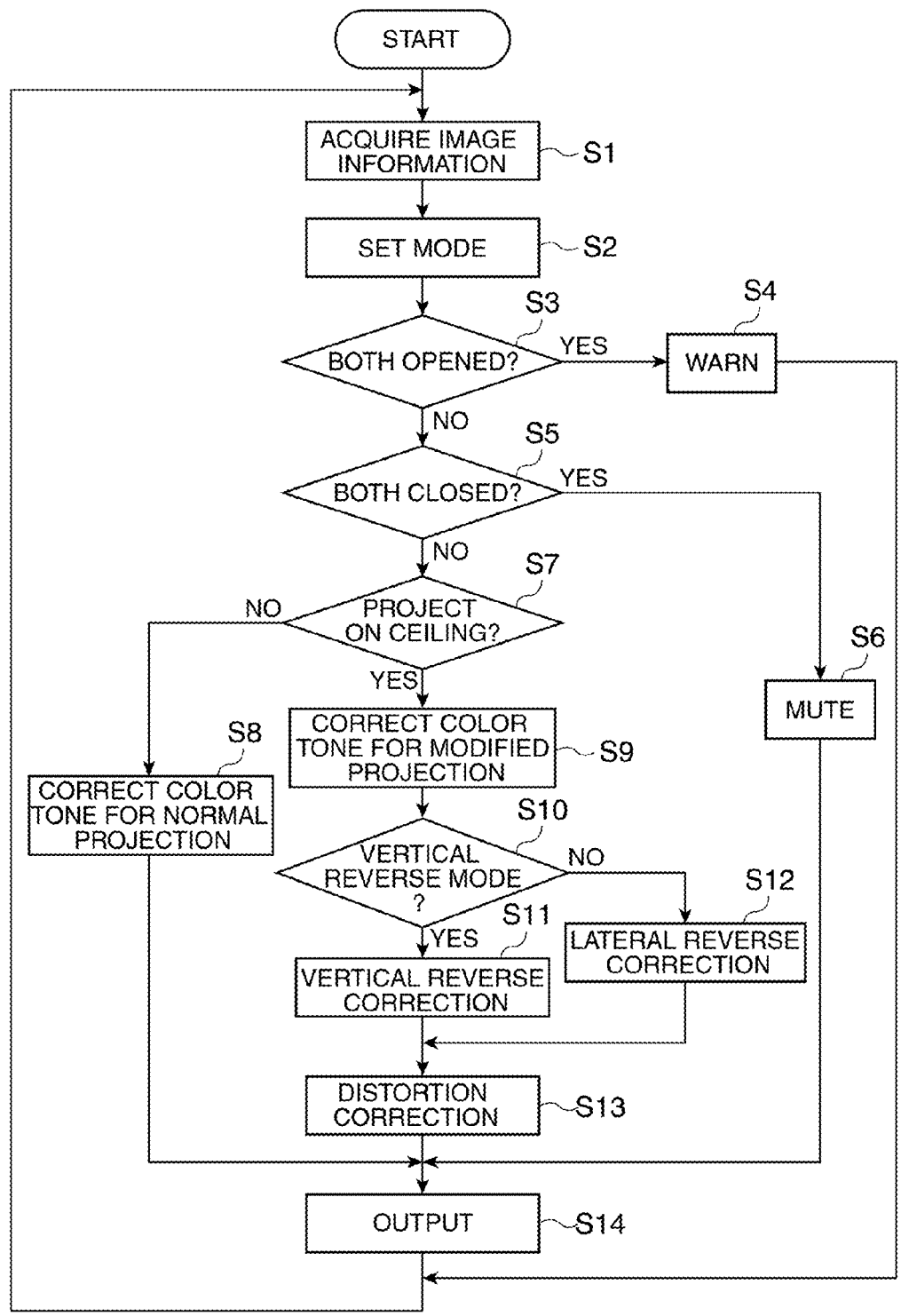
FIG. 17 is a flowchart showing processing to adjust color tone and image direction in the embodiment.

Hereinafter, processing to adjust color tone and direction of an image by the projector 1 will be described. FIG. 17 is a flowchart showing the adjustment processing.

When a predetermined operation is carried out by the user such as turning on the power of the projector 1, the acquisition unit 61 acquires image information according to a formed image from an external device connected to the projector 1 (step S1).

After step S1, the setting unit 62 sets the mode of the projector 1 with respect to the direction of the image to one of the vertical reverse mode and the lateral reverse mode in accordance with the user's input operation on the operation unit 5 (step S2). This step S2 is skipped if the change in the setting is not necessary for the user.

After step S2, the first determination unit 630 determines whether it is the fourth state where both the cover 41 and the lens shutter 42 are opened or not, in accordance with the opening and closing state of the cover 41 and the lens shutter 42 detected by the first and second detection units 71 and 72 (step S3).

If the first determination unit 630 determines that it is the fourth state where both the cover 41 and the lens shutter 42 are opened (YES in step S3), the warning unit 639 warns the user by turning on a warning lamp, not shown, provided on the exterior casing 2 or by causing a speaker, not shown, provided in the exterior casing 2 to output a warning sound (step S4).

Meanwhile, if the first determination unit 630 determines that it is not the fourth state where both the cover 41 and the lens shutter 42 are opened (NO in step S3), the second determination unit 631 determines whether it is the third state where both the cover 41 and the lens shutter 42 are closed or not (step S5).

If the second determination unit 631 determines that it is the third state where both the cover 41 and the lens shutter 42 are closed (YES in step S5), the mute unit 638 generates image information to be displayed in black by the liquid crystal panels 351 and shifts the output state of the light source lamp 311 to a low-output state (step S6).

Meanwhile, if the second determination unit 631 determines that it is not the third state where both the cover 41 and the lens shutter 42 are closed (NO in step S3), the third determination unit 632 determines whether it is modified projection (the second state) where the cover 41 is opened and the lens shutter 42 is closed, or not (normal projection (the first state) where the cover 41 is closed and the lens shutter 42 is opened) (step S7).

If the third determination unit 632 determines that it is normal projection (NO in step S7), the color tone correction unit 633 corrects the color tone of the image information to color tone corresponding to the screen (step S8).

Meanwhile, if the third determination unit 632 determines that it is modified projection (YES in step S7), the color tone correction unit 633 corrects the color tone of the image information to color tone corresponding to the ceiling (step S9).

After step S9, the selection unit 634 determines which of the vertical reverse mode and the lateral reverse mode the projector 1 is set in (step S10). If it is determined that the projector 1 is set in the vertical reverse mode (YES in step S10), the selection unit 634 causes the vertical reverse unit 635 function and further corrects the image information corrected by the color tone correction unit 633 so that the vertical direction of the image formed by the liquid crystal panels 351 is reversed from the vertical direction of the image formed on the basis of the image information before correction (step S11).

On the other hand, if it is determined that the projector 1 is set in the lateral reverse mode (NO in step S10), the selection unit 634 causes the lateral reverse unit 636 function and further corrects the image information corrected by the color tone correction unit 633 so that the lateral direction of the image formed by the liquid crystal panels 351 is reversed from the lateral direction of the image formed on the basis of the image information before correction (step S12).

After these steps S9 to S12, the distortion correction unit 637 further performs keystone correction on the image information corrected by the units 633, 635 and 636 in order to prevent the generation of a keystone distortion in the image projected on the ceiling (step S13).

After step S13, the output unit 65 outputs the corrected image information to the liquid crystal panels 351 (step S14).

The projector 1 according to this embodiment as described above can achieve the following advantages.

In normal projection, if the first state is employed where the cover 41 closes the first opening 212 and the lens shutter 42 opens the second opening 411, image light emitted from the projection lens 36 can be emitted outward from the projector 1 through the second opening 411 without changing the light exiting direction of the image light from the projection lens 36.

In modified projection, if the second state is employed where the cover 41 is opened in an inclined state with respect to the optical axis of image light from the projection lens 36 and the lens shutter 42 is closed, the image light emitted from the projection lens 36 can be reflected by the reflection mirror 43 and the image light with its projection direction changed can be emitted outward from the projector 1.

Thus, in this embodiment, since normal projection and modified projection can be switched simply by the opening and closing of the cover 41 and the lens shutter 42, the projection direction change unit 4 need not be removed from the exterior casing 2 at the time of normal projection, which prevents the user from losing the projection direction change unit 4.

Moreover, since normal projection and modified projection can be switched simply by the opening and closing of the cover 41 and the lens shutter 42, the projector 1 that can change the direction of projection can be configured without increasing the size of the projector 1.

The first lock mechanism having the stopper canceling pawl 44 can regulate unexpected opening of the cover 41 at the time of normal projection (the first state), and this improves convenience. Moreover, since the first lock mechanism cancels the regulation in the third state where both the cover 41 and the lens shutter 42 are closed, modified projection can be carried out if the third state is shifted to the second state by opening the cover 41.

When the third state where both the cover 41 and the lens shutter 42 are closed is shifted to the normal projection state by moving the lens shutter 42 to the position where the lens shutter 42 opens the second opening 411, the stopper canceling pawl 44 is located between the lens shutter 42 and the cover 41 and therefore can securely regulate the opening of the cover 41 holding the lens shutter 42.

In the third state where both the cover 41 and the lens shutter 42 are closed, the stopper canceling pawl 44 is not located between the cover 41 and the lens shutter 42 and cancels the regulation. Therefore, if the third state is shifted to the second state by opening the cover 41, modified projection can be carried out.

In modified projection (the second state), the second lock mechanism having the stopper canceling pawl 44, the energizing member 416 and the stopper 417 can regulate the movement of the lens shutter 42. Therefore, the image light from the projection lens 36 can be securely reflected by the reflection mirror 43.

In the third state where the cover 41 is closed while the lens shutter 42 remains regulated at the position where the lens shutter 42 closes the second opening 411, the second lock mechanism cancels the movement regulation of the lens shutter 42. Therefore, if the third state is shifted to the first state by moving the lens shutter 42 toward the position where the lens shutter 42 opens the second opening 411, normal projection can be carried out.

In modified projection, the stopper 417 is energized by the energizing member 416, protrudes from within the recess part 419, and regulates the movement of the lens shutter 42 toward the side where the lens shutter 42 opens the second opening 411. Therefore, the image light from the projection lens 36 can be securely reflected by the reflection mirror 43.

In the third state where the cover 41 is closed while the lens shutter 42 remains regulated at the position where the lens shutter 42 closes the second opening 411, the stopper canceling pawl 44 presses the stopper 417 and causes the stopper 417 to be arranged in the recess part 419. Therefore, the regulation can be canceled. Thus, if the third state is shifted to the first state by moving the lens shutter 42 toward the position where the lens shutter 42 opens the second opening 411, normal projection can be carried out.

The stopper canceling pawl 44 has both the function of preventing the cover 41 from opening at the time of normal projection and the function of canceling the movement regulation of the lens shutter 42 by the stopper 417 when the modified projection state is shifted to the third state by closing the cover 41. Therefore, the number of members can be reduced and the manufacturing cost can be reduced, compared with the case where a pawl is provided for each function.

The control device 6 determines whether normal projection or modified projection is carried out, on the basis of the result of detection of the opening and closing state of the cover 41 and the lens shutter 42, and corrects the color tone of image information in accordance with the projection target surface (screen or ceiling) in each state. Therefore, a suitable projected image that is easy for the user to view can be automatically formed and the convenience of the projector 1 can be improved.

In the case of modified projection, the control device 6 corrects image information to form an image having correct vertical and lateral directions to the user. This can further improve convenience.

In the case of modified projection, the control device 6 carries out keystone correction on image information. This can securely improve convenience.

In the third state where both the cover 41 and the lens shutter 42 are closed, the control device 6 corrects image information so that an image formed by the liquid crystal panels 351 becomes a solid black image, and also shifts the output state of the light source lamp 311 to a low-output state. Therefore, the lens shutter 42 and the cover 41 can be prevented from reaching high temperatures.

If, by any change, the fourth state is created where both the cover 41 and the lens shutter 42 are opened, the control device 6 warns the user by outputting a warning sound from a speaker or the like. Therefore, as the user presses the stopper 417 so that the stopper 417 is arranged in the recess part 419 and so that the lens shutter 42 is closed, the projector 1 can restore its normal state.

The invention is not limited to the above embodiment and various modifications and improvements without departing from the scope of the invention are included in the invention.

For example, while the stopper 417 in the embodiment is abutted against the sidewall 423 of the lens shutter 42 and thus regulates the movement of the lens shutter 42 at the time of modified projection where the cover 41 is opened, other suitable configurations can be employed for the regulating method. For example, a hole may be formed on the back side of the lens shutter 42, and at the time of modified projection where the cover 41 is opened, the stopper 417 can be energized by the energizing member and inserted into the hole to regulate the movement of the lens shutter 42.

In the embodiment, the stopper canceling pawl 44 has both the function of preventing the cover 41 from opening at the time of normal projection and the function of canceling the movement regulation of the lens shutter 42 by the stopper 417 when the modified projection state is shifted to the third state by closing the cover 41. However, a pawl may be provided for each function.

In the embodiment, an example of placing and using the projector 1 on a horizontal surface is described. However, other suitable installation methods can be employed for the projector 1. For example, the projector 1 may be installed on a sidewall surface of the room with its bottom surface 22 facing the sidewall surface. The projector 1 can be thus installed and used so that image light can be projected to the ceiling in normal projection, whereas in modified projection, image light can be projected to a screen or the like installed vertically to the floor.

In the embodiment, the cover 41 is configured in such a manner that the side of the top surface 23 opens. However, the cover 41 may be configured, for example, to open toward the +Y axis direction so that image light can be projected in the +Z axis direction in normal projection, whereas in modified projection, image light can be projected in the +Y axis direction.

In the embodiment, one of the lateral surfaces 21 is the light exiting surface 211. However, the top surface 23 may serve as a light exiting surface and the projection direction change unit 4 may be provided on the top surface 23. If the projector configured in this manner is placed and used, for example, on a horizontal surface, image light is projected in the +X axis direction (toward the ceiling) in normal projection, whereas image light is projected in the YZ plane direction in modified projection.

In these cases, the switching of color tone correction by the color tone correction unit 633 in normal projection and in modified projection, and whether or not to execute the functions of the vertical reverse unit 635, the lateral reverse unit 636 and the distortion correction unit 637 in normal projection and in modified projection, can be set by the user via the operation unit 5.

In the embodiment, in the state where the cover 41 and the lens shutter 42 are closed, the lens shutter 42 is arranged closely to the projection lens 36. However, in the state where the cover 41 and the shutter are closed, the shutter may be arranged at a distant position from the projection lens 36. That is, in the state where the cover 41 and the shutter are closed, the projection lens 36 may be arranged at a distant position from the shutter.

In the embodiment, the light modulation device includes the liquid crystal panels 351. However, the light modulation device may include a DMD (Digital Micromirror Device; trademark by Texas Instruments, U.S.)

The invention can be utilized for a projector and particularly suitably utilized for a projector used in a home theater.

What is claimed is:

1. A projector comprising:
a light source;
a light modulation device which modulates a light emitted from the light source and forms image light;
a projection device which magnifies and projects the image light; and
an exterior casing,
wherein:
on a light exiting surface for the image light of the exterior casing, a first opening is formed and a projection direction change unit which opens and closes the first opening is provided,
the projection direction change unit has:
a cover which has a second opening for passing the image light from the projection device and which is provided rotatably in an off-plane direction with respect to the light exiting surface and thus opens and closes the first opening;
a shutter which is movably provided along an inner surface of the cover and thus opens and closes the second opening;
a reflection mirror which is provided on an inner surface of the shutter and reflects the image light from the projection device, and
a first lock mechanism which regulates opening of the cover in a first state where the first opening is closed by the cover and the second opening is opened by the shutter, and
the first lock mechanism has a lock pawl which protrudes inward of the first opening from a peripheral edge of the first opening and which is located between the cover and the shutter in the first state.

2. The projector according to claim 1, further comprising a second lock mechanism which regulates movement of the shutter in a second state where the first opening is opened by the cover and the second opening is closed by the shutter, and which cancels the regulation in a third state where the first opening is closed by the cover and the second opening is closed by the shutter.

3. The projector according to claim 2, wherein the second lock mechanism has:
an energizing member provided on the inner surface of the cover;
a stopper which is connected to the energizing member and regulates movement of the shutter in the second state; and
a stopper canceling pawl which protrudes inward of the first opening from a peripheral edge of the first opening, and wherein in the third state, the stopper canceling pawl presses the stopper toward the cover against an energizing force of the energizing member and thus cancels the regulation.

4. The projector according to claim 3, wherein in a first state where the first opening is closed by the cover and the second opening is opened by the shutter, the stopper canceling pawl is located between the cover and the shutter and regulates opening of the cover.

5. A projector comprising:

a light source;

a light modulation device which modulates a light emitted from the light source and forms image light;

a projection device which magnifies and projects the image light; and an exterior casing, wherein:

on a light exiting surface for the image light of the exterior casing, a first opening is formed and a projection direction change unit which opens and closes the first opening is provided, the projection direction change unit has:

a cover which has a second opening for passing the image light from the projection device and which is provided rotatably in an off-plane direction with respect to the light exiting surface and thus opens and closes the first opening;

a shutter which is movably provided along an inner surface of the cover and thus opens and closes the second opening; and a reflection mirror which is provided on an inner surface of the shutter and reflects the image light from the projection device, a second lock mechanism which regulates movement of the shutter in a second state where the first opening is opened by the cover and the second opening is closed by the shutter, and which cancels the regulation in a third state where the first opening is closed by the cover and the second opening is closed by the shutter, and the second lock mechanism has:

an energizing member provided on the inner surface of the cover;

a stopper which is connected to the energizing member and regulates movement of the shutter in the second state; and a stopper canceling pawl which protrudes inward of the first opening from a peripheral edge of the first opening, and in the third state, the stopper canceling pawl presses the stopper toward the cover against an energizing force of the energizing member and thus cancels the regulation.

* * * * *